United States Patent
Oyaizu et al.

(10) Patent No.: US 11,468,574 B2
(45) Date of Patent: Oct. 11, 2022

(54) IMAGE PROCESSING APPARATUS AND IMAGE PROCESSING METHOD

(71) Applicant: Sony Corporation, Tokyo (JP)

(72) Inventors: Hideki Oyaizu, Tokyo (JP); Atsushi Ito, Kanagawa (JP); Takeshi Uemori, Tokyo (JP); Suguru Aoki, Tokyo (JP); Ryuta Satoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 378 days.

(21) Appl. No.: 16/650,870

(22) PCT Filed: Aug. 24, 2018

(86) PCT No.: PCT/JP2018/031296
§ 371 (c)(1),
(2) Date: Mar. 26, 2020

(87) PCT Pub. No.: WO2019/069581
PCT Pub. Date: Apr. 11, 2019

(65) Prior Publication Data
US 2020/0294245 A1     Sep. 17, 2020

(30) Foreign Application Priority Data
Oct. 2, 2017   (JP) .............................. JP2017-192988

(51) Int. Cl.
*G06T 7/215*     (2017.01)
*G08G 1/04*      (2006.01)
*G08G 1/16*      (2006.01)

(52) U.S. Cl.
CPC .............. *G06T 7/215* (2017.01); *G08G 1/04* (2013.01); *G08G 1/166* (2013.01);
(Continued)

(58) Field of Classification Search
CPC ........ G06V 20/56; G06V 20/58; G08G 1/166; G06T 2207/10048
See application file for complete search history.

(56) References Cited

U.S. PATENT DOCUMENTS 9,437,000 B2     9/2016 Lee
2006/0140481 A1  6/2006 Kim
(Continued)

FOREIGN PATENT DOCUMENTS

CN     103020656 A     4/2013
CN     103792515 A     5/2014
(Continued)

OTHER PUBLICATIONS

International Search Report and Written Opinion dated Oct. 30, 2018 for PCT/JP2018/031296 filed on Aug. 24, 2018, 9 pages including English Translation of the International Search Report.

*Primary Examiner* — Vincent Rudolph
*Assistant Examiner* — Raphael Schwartz
(74) *Attorney, Agent, or Firm* — Xsensus, LLP

(57) ABSTRACT

An image processing apparatus and an image processing method for processing far-infrared ray images are provided. Specific temperature ranges constituted by pixels having values falling within a temperature range characteristic of a specific target are extracted from a far-infrared ray image captured of the same target. Of the specific temperature ranges, those having motion vectors close to each other are integrated so as to generate integrated ranges. The integrated ranges having motion vectors close to a global motion vector indicative of the motion of the image as a whole are excluded to obtain excluded integrated ranges. Visible light ranges corresponding to the specific temperature ranges in the excluded integrated ranges are extracted from the visible light image to generate visible light motion ranges. The positions of the visible light motion ranges are corrected on the basis of the motion vector of the excluded integrated ranges as a whole.

19 Claims, 12 Drawing Sheets

(52) U.S. Cl.
CPC ... *B60R 2300/303* (2013.01); *B60R 2300/304* (2013.01); *G06T 2207/10048* (2013.01); *G06T 2207/30196* (2013.01); *G06T 2207/30261* (2013.01)

(56) References Cited

U.S. PATENT DOCUMENTS

| | | | | |
|---|---|---|---|---|
| 2007/0171033 | A1* | 7/2007 | Nagaoka | G06K 9/6289 |
| | | | | 348/148 |
| 2012/0008005 | A1* | 1/2012 | Fukunishi | G06T 5/002 |
| | | | | 348/222.1 |
| 2013/0243261 | A1* | 9/2013 | Matsuda | G08G 1/166 |
| | | | | 382/106 |

FOREIGN PATENT DOCUMENTS

| | | | |
|---|---|---|---|
| CN | 103996182 | A | 8/2014 |
| CN | 106340032 | A | 1/2017 |
| JP | 3598793 | A | 12/2004 |
| JP | 2006-338594 | A | 12/2006 |
| JP | 2007-074143 | A | 3/2007 |
| JP | 2008-077154 | A | 4/2008 |
| JP | 2010-088045 | A | 4/2010 |
| JP | 4734884 | B2 | 7/2011 |
| JP | 5491242 | B2 | 5/2014 |
| KR | 100651034 | B1 | 11/2006 |
| WO | 2012/073722 | A1 | 6/2012 |

* cited by examiner

IMAGE PROCESSING APPARATUS AND IMAGE PROCESSING METHOD

CROSS-REFERENCE TO RELATED APPLICATIONS

The present application is based on PCT filing PCT/JP2018/031296, filed Aug. 24, 2018, which claims priority to JP 2017-192988, filed Oct. 2, 2017, the entire contents of each are incorporated herein by reference.

TECHNICAL FIELD

The technology disclosed in this description relates to an image processing apparatus and an image processing method for processing far-infrared ray images.

BACKGROUND ART

Recent years have seen active development of vehicle driving technology. For example, techniques have been developed using visible light cameras and distance sensors to detect humans or obstacles in front of the vehicle so as to avert such obstacles by applying automatic brakes. Obviously, similar techniques may be used to estimate the possibility of collision between the own vehicle on one hand and obstacles on the side or in the rear of the vehicle on the other hand.

CITATION LIST

Patent Literature

[PTL 1]
  Japanese Patent No. 5491242
[PTL 2]
  Japanese Patent No. 4734884
[PTL 3]
  Japanese Patent No. 3598793

SUMMARY

Technical Problem

An object of the technology disclosed in this description is to provide an image processing apparatus and an image processing method for processing far-infrared ray images.

Solution to Problem

According to a first aspect of the technology disclosed in this description, there is provided an image processing apparatus including: a vector estimation section configured to estimate, from a visible light image captured by a visible light camera, a global motion vector indicative of a motion of the image as a whole; a range extraction section configured to extract, from a far-infrared ray image captured by a far-infrared ray camera for imaging the same target as the visible light camera, specific temperature ranges constituted by pixels having values falling within a temperature range characteristic of a specific target; a range integration section configured to integrate, of the extracted specific temperature ranges, those ranges having motion vectors close to each other so as to generate integrated ranges; a range exclusion section configured to exclude the integrated ranges having motion vectors close to the global motion vector to obtain excluded integrated ranges, before extracting from the visible light image the visible light ranges corresponding to the specific temperature ranges in the excluded integrated ranges so as to generate visible light motion ranges; and an image combination section configured to correct positions of the visible light motion ranges based on the motion vector of the excluded integrated ranges as a whole, before combining the positionally corrected visible light motion ranges in a time direction.

The image combination section may correct the positions of the visible light motion ranges in such a manner that the positions remain unchanged on a screen in the time direction. Further, the range extraction section may extract specific temperature ranges constituted by pixels having values falling within the temperature range including human body temperatures, for example.

The image processing apparatus may further include a detection section configured to detect a range that includes the specific target from a composite image generated by the image combination section. The image processing apparatus may also include a motion estimation section configured to estimate a motion of the range detected by the detection section.

Also, the image processing apparatus may further include a comparison section configured to make a relative comparison between the position of the specific target following a predetermined time period on one hand, the position being predicted on the basis of the motion vectors of the excluded integrated ranges, and an expected arrival position of the mobile body following the same time period on the other hand. The image processing apparatus may also include a warning section configured to present a driver of the mobile body with a warning of a risk of collision reflecting a possibility, being calculated on the basis of the relative position, of collision between the specific target and the mobile body.

Further, according to a second aspect of the technology disclosed in this description, there is provided an image processing method including the steps of: estimating, from a visible light image captured by a visible light camera, a global motion vector indicative of a motion of the image as a whole; extracting, from a far-infrared ray image captured by a far-infrared ray camera for imaging the same target as the visible light camera, specific temperature ranges constituted by pixels having values falling within a temperature range characteristic of a specific target; integrating, of the extracted specific temperature ranges, those ranges having motion vectors close to each other so as to generate integrated ranges; excluding the integrated ranges having motion vectors close to the global motion vector to obtain excluded integrated ranges, before extracting from the visible light image the visible light ranges corresponding to the specific temperature ranges in the excluded integrated ranges so as to generate visible light motion ranges; and correcting the positions of the visible light motion ranges based on the motion vector of the excluded integrated ranges as a whole, before combining the positionally corrected visible light motion ranges in a time direction.

Advantageous Effect of Invention

The technology disclosed in this description provides an image processing apparatus and an image processing method for processing far-infrared ray images.

The advantageous effects stated in this description are only examples and are not limitative of the present invention. Further, there may be additional advantageous effects derived from the description of the present invention.

Other objects, features, and advantages of the technology disclosed in this description will become apparent upon a reading of the ensuing more detailed explanation of some preferred embodiments of this technology with reference to the appended drawings.

DESCRIPTION OF EMBODIMENTS

Embodiments of the technology disclosed in this description are explained below in detail with reference to the accompanying drawings.

Figure 1:
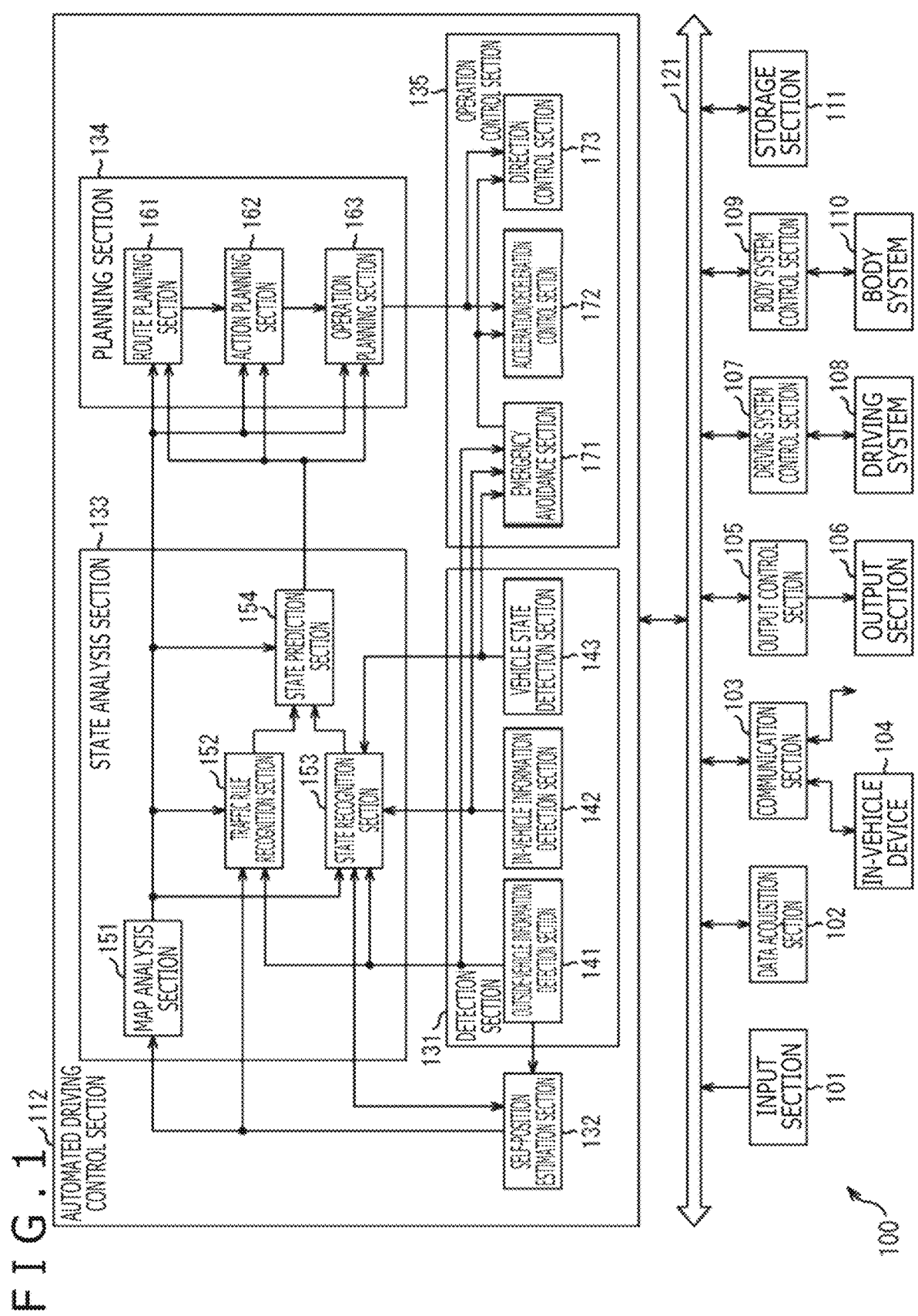
FIG. 1 is a block diagram depicting an exemplary overall functional configuration of a vehicle control system 100.

FIG. 1 is a block diagram depicting an exemplary overall functional configuration of a vehicle control system 100 as an exemplary mobile body control system to which the present technology may be applied.

In the description that follows, the vehicle in which the vehicle control system 100 is installed will be referred to as the own vehicle in order to distinguish from other vehicles.

The vehicle control system 100 includes an input section 101, a data acquisition section 102, a communication section 103, in-vehicle devices 104, an output control section 105, an output section 106, a driving system control section 107, a driving system 108, a body system control section 109, a body system 110, a storage section 111, and an automated driving control section 112. The input section 101, the data acquisition section 102, the communication section 103, the output control section 105, the driving system control section 107, the body system control section 109, the storage section 111, and the automated driving control section 112 are connected with one another via a communication network 121. The communication network 121 may be a CAN (Controller Area Network), a LIN (Local Interconnect Network), a LAN (Local Area Network), or an onboard communication network and a bus based on a suitable protocol such as FlexRay (registered trademark), for example. Some of the components of the vehicle control system 100 may be directly connected with each other without the intervention of the communication network 121.

In the description that follows, where the components of the vehicle control system 100 communicate with one another via the communication network 121, the reference to the communication network 121 will be omitted. For example, in a case where the input section 101 and the automated driving control section 112 communicate with each other via the communication network 121, it will be simply stated that the input section 101 and the automated driving control section 112 communicate with each other.

The input section 101 includes devices used by a passenger to input various data and instructions. For example, the input section 101 includes operating devices such as a touch panel, buttons, a microphone, switches, and levers; and other operating devices permitting non-manual input such as by voice or by gesture. As another example, the input section 101 may be a remote control device that uses infrared rays or radio waves, or an externally connected device such as a mobile device or a wearable device supporting the operation of the vehicle control system 100. The input section 101 generates input signals based on the data and instructions input by the passenger, and supplies the generated signals to the components of the vehicle control system 100.

The data acquisition section 102 includes various sensors that acquire data for use in the processing by the vehicle control system 100. The data acquisition section 102 supplies the acquired data to the components of the vehicle control system 100.

For example, the data acquisition section 102 includes diverse sensors for detecting the state of the own vehicle. Specifically, the data acquisition section 102 includes, for example, a gyro sensor, an acceleration sensor, and an inertial measurement unit (IMU), as well as sensors for detecting the amount of operation of the accelerator pedal, the amount of operation of the brake pedal, steering angle of the steering wheel, engine speed, motor rotational speed, and wheel rotational speed.

As another example, the data acquisition section 102 also includes various sensors for detecting information regarding the outside of the own vehicle. Specifically, the data acquisition section 102 includes, for example, imaging apparatuses such as a ToF (Time Of Flight) camera, a stereo camera, a monocular camera, an infrared ray camera, and other cameras. As a further example, the data acquisition section 102 includes environment sensors for detecting the weather or meteorological conditions, and surrounding information detection sensors for detecting objects around the own vehicle. The environment sensors include a raindrop sensor, a fog sensor, a sunshine sensor, and a snowfall sensor, for example. The surrounding information detection sensors include an ultrasonic sensor, radar, LiDAR (Light Detection and Ranging, Laser Imaging Detection and Ranging), and sonar, for example.

As yet another example, the data acquisition section 102 further includes various sensors for detecting the current position of the own vehicle. Specifically, the data acquisition section 102 includes, for example, a GNSS (Global Navigation Satellite System) receiver for receiving GNSS signals from GNSS satellites.

As another example, the data acquisition section 102 includes various sensors for detecting information regarding the interior of the vehicle. Specifically, the data acquisition section 102 includes, for example, an imaging apparatus for imaging the driver, a biosensor for detecting biological information regarding the driver, and a microphone for collecting sounds from inside the vehicle interior. The biosensor is attached, for example, to the seat surface or to the steering wheel to detect the biological information regarding the passenger sitting on the seat or the driver holding the steering wheel.

The communication section 103 communicates with the in-vehicle devices 104 and with various devices, servers, and base stations outside the vehicle. In so doing, the communication section 103 transmits data supplied from the components of the vehicle control system 100 to the outside and supplies the received data therefrom to the components of the vehicle control system 100. It is to be noted that the communication protocol supported by the communication section 103 is not limited to anything specific and that the communication section 103 is capable of supporting multiple communication protocols.

For example, the communication section 103 communicates wirelessly with the in-vehicle devices 104 by wireless LAN, Bluetooth (registered trademark), NFC (Near Field Communication), WUSB (Wireless USB) or the like. As another example, the communication section 103 may communicate by wire with the in-vehicle devices 104 via a connection terminal, not depicted (and by cable if necessary), using USB (Universal Serial Bus), HDMI (High-Definition Multimedia Interface), MHL (Mobile High-definition Link) or the like.

As a further example, the communication section 103 communicates, via a base station or an access point, with devices (e.g., application server or control server) that exist on an external network (e.g., the Internet, a cloud network, or a business operator's proprietary network). As a still further example, the communication section 103 communicates, using P2P (Peer To Peer) technology, with terminals (e.g., terminals carried by pedestrians, terminals installed in shops, or MTC (Machine Type Communication) terminals) located near the own vehicle. As yet another example, the communication section 103 performs V2X communications such as communication between vehicles (Vehicle to Vehicle), communication between the vehicle and the road (Vehicle to Infrastructure), communication between the own vehicle and the home (Vehicle to Home), and communication between the vehicle and pedestrians (Vehicle to Pedestrian). As another example, the communication section 103 includes a beacon receiver that receives radio waves or electromagnetic waves from wireless stations installed along the road so as to acquire information such as the current position, traffic congestion, traffic regulation, and time to reach destination.

The in-vehicle devices 104 include, for example, a mobile device or a wearable device carried by the passenger, an information device brought in or installed on the own vehicle, and a navigation device for searching for the route to a desired destination.

The output control section 105 controls output of diverse kinds of information regarding the passenger in the own vehicle or regarding the outside of the vehicle. For example, the output control section 105 generates an output signal that includes at least either visual information (e.g., image data) or audio information (e.g., sound data) and outputs the generated signal to the output section 106 so as to control output of the visual and audio information from the output section 106. Specifically, the output control section 105 combines, for example, the image data captured by different imaging apparatuses in the data acquisition section 102 into a bird's-eye view image or a panoramic image, and supplies an output signal including the generated image to the output section 106. As another example, the output control section 105 generates sound data including a warning sound or a warning message warning of the risk of collision, accidental contact, or entry into a hazardous zone, and supplies an output signal including the generated sound data to the output section 106.

The output section 106 includes devices capable of outputting visual or audio information to the passenger in the own vehicle or to the outside of the vehicle. For example, the output section 106 includes a display apparatus, an instrument panel, audio speakers, headphones, a wearable device such as a spectacle type display worn by the passenger, projectors, and lamps. The display apparatus included in the output section 106 may, besides being an ordinary display apparatus, constitute a head-up display, a transmissive display, or a device having AR (Augmented Reality) functions for displaying visual information within the driver's field of view.

The driving system control section 107 generates various control signals and supplies the generated signals to the driving system 108 to control the driving system 108. The driving system control section 107 also supplies, as needed, control signals to the components other than the driving system 108 so as to notify them of the control state of the driving system 108.

The driving system 108 includes various devices related to the drive train of the own vehicle. For example, the driving system 108 includes a drive power generation apparatus such as an internal combustion engine or drive motors for generating drive power, a drive power transmission mechanism for transmitting drive power to the wheels, a steering mechanism for adjusting the steering angle, a braking apparatus for generating braking force, an ABS (Antilock Brake System), an ESC (Electronic Stability Control), and an electric power steering apparatus.

The body system control section 109 generates various control signals and supplies them to the body system 110 to control the body system 110. The body system control section 109 also supplies, as needed, control signals to the components other than the body system 110 so as to notify them of the control state of the body system 110.

The body system 110 includes various body-related devices mounted on the car body. For example, the body system 110 includes a keyless entry system, a smart key system, a power window device, a power seat, the steering wheel, an air conditioner, and various lamps (e.g., head lamps, back lamps, brake lamps, winkers, and fog lamps).

The storage section 111 includes, for example, a magnetic storage device such as a ROM (Read Only Memory), a RAM (Random Access Memory), or an HDD (Hard Disc Drive); a semiconductor storage device, an optical storage device, and a magneto-optical storage device. The storage section 111 stores various programs and data for use by the components of the vehicle control system 100. For example, the storage section 111 stores three-dimensional high-precision maps such as dynamic maps, global maps having lower resolution and covering wider areas than high-precision maps, and local maps that include information regarding the surroundings of the own vehicle.

The automated driving control section 112 performs control related to automated driving such as autonomous traveling or drive assist. Specifically, the automated driving control section 112 performs, for example, coordinated control aimed at implementing ADAS (Advanced Driver Assistance System) functions including collision avoidance or impact mitigation for the own vehicle, follow-on driving based on inter-vehicle distance, cruise control, collision warning for the own vehicle, and lane deviation warning for the own vehicle. As another example, the automated driving control section 112 performs coordinated control aimed at self-driving for autonomous traveling without the driver's intervention. The automated driving control section 112 includes a detection section 131, a self-position estimation section 132, a state analysis section 133, a planning section 134, and an operation control section 135.

The detection section 131 detects diverse kinds of information necessary for controlling automated driving. The detection section 131 includes an outside-vehicle information detection section 141, an in-vehicle information detection section 142, and a vehicle state detection section 143.

The outside-vehicle information detection section 141 performs processes of detecting information regarding the outside of the own vehicle on the basis of data or signals from the components of the vehicle control system 100. For example, the outside-vehicle information detection section 141 performs processes of detecting, recognizing, and tracking objects around the own vehicle and a process of detecting the distances to the objects. The objects to be detected include, for example, vehicles, humans, obstacles, structures, roads, traffic lights, traffic signs, and road signs. As another example, the outside-vehicle information detection section 141 performs processes of detecting the environment surrounding the own vehicle. The surrounding environment to be detected includes, for example, the weather, temperature, humidity, brightness, and road conditions. The outside-vehicle information detection section 141 supplies data indicative of the results of the detection processes to the self-position estimation section 132, to a map analysis section 151, a traffic rule recognition section 152, and a state recognition section 153 in the state analysis section 133, and to an emergency avoidance section 171 in the operation control section 135.

The in-vehicle information detection section 142 performs processes of detecting information regarding the vehicle interior on the basis of data or signals from the components of the vehicle control system 100. For example, the in-vehicle information detection section 142 performs processes of recognizing and authenticating the driver, a process of detecting the driver's state, a process of detecting a passenger, and a process of detecting the environment inside the vehicle. The driver's state to be detected includes, for example, physical conditions, degree of vigilance, degree of concentration, degree of fatigue, and line-of-sight direction. The environment to be detected inside the vehicle includes, for example, temperature, humidity, brightness, and odor. The in-vehicle information detection section 142 supplies data indicative of the results of the detection processes to the state recognition section 153 in the state analysis section 133 and to the emergency avoidance section 171 in the operation control section 135.

The vehicle state detection section 143 performs processes of detecting the state of the own vehicle on the basis of data or signals from the components of the vehicle control system 100. The state of the own vehicle to be detected includes, for example, vehicle speed, acceleration, steering angle, presence or absence of anomaly and its details, state of driving operations, position and inclination of the power seat, state of door lock, and state of other onboard equipment. The vehicle state detection section 143 supplies data indicative of the results of the detection processes to the state recognition section 153 in the state analysis section 133 and to the emergency avoidance section 171 in the operation control section 135.

The self-position estimation section 132 performs processes of estimating the position and posture of the own vehicle on the basis of data or signals from the components of the vehicle control system 100 such as the outside-vehicle information detection section 141 and the state recognition section 153 in the state analysis section 133. Also, the self-position estimation section 132 generates, as needed, a local map used for estimating the self-position (the map will be referred to as the self-position estimation map hereunder). An example of the self-position estimation map is a high-precision map that uses technology such as SLAM (Simultaneous Localization and Mapping). The self-position estimation section 132 supplies data indicative of the results of the estimation processes to the map analysis section 151, the traffic rule recognition section 152, and the state recognition section 153 in the state analysis section 133. The self-position estimation section 132 further stores the self-position estimation map into the storage section 111.

The state analysis section 133 performs processes of analyzing the state of the own vehicle and its surroundings. The state analysis section 133 includes the map analysis section 151, the traffic rule recognition section 152, the state recognition section 153, and a state prediction section 154.

The map analysis section 151 creates maps that include data necessary for the process of automated driving by performing processes of analyzing various maps stored in the storage section 111 using, as needed, data or signals from the components of the vehicle control system 100 such as the self-position estimation section 132 and the outside-vehicle information detection section 141. The map analysis section 151 supplies the maps thus created to the traffic rule recognition section 152, to the state recognition section 153, and to the state prediction section 154, as well as to a route planning section 161, an action planning section 162, and an operation planning section 163 in the planning section 134.

The traffic rule recognition section 152 performs processes of recognizing the traffic rules applicable around the own vehicle on the basis of data or signals from the components of the vehicle control system 100 such as the self-position estimation section 132, the outside-vehicle information detection section 141, and the map analysis section 151. The recognition processes permit recognition of the positions and states of the traffic lights around the own vehicle, details of the traffic controls applicable around the own vehicle, and lanes that can be traveled, for example. The traffic rule recognition section 152 supplies data indicative of the results of the recognition processes to the state prediction section 154.

The state recognition section 153 performs processes of recognizing the states regarding the own vehicle on the basis of data or signals from the components of the vehicle control system 100 such as the self-position estimation section 132, the outside-vehicle information detection section 141, the in-vehicle information detection section 142, the vehicle state detection section 143, and the map analysis section 151. For example, the state recognition section 153 performs processes of recognizing the state of the own vehicle, the state of the surroundings of the own vehicle, and the state of the driver of the own vehicle. Also the state recognition section 153 generates, as needed, a local map used for recognizing the state of the surroundings of the own vehicle (the map will be referred to as the state recognition map hereunder). An example of the state recognition map is an Occupancy Grid Map.

The state of the own vehicle to be recognized includes, for example, the position, posture, and motion (e.g., speed, acceleration, traveling direction) of the own vehicle, as well as the presence or absence of anomaly and its details of the own vehicle. The state of the surroundings of the own vehicle to be recognized includes, for example, types and positions of motionless objects in the surroundings; types, positions, and motions of moving objects in the surroundings (e.g., speed, acceleration, traveling direction); configurations and surface conditions of the roads in the surroundings; and the weather, temperature, humidity, and brightness in the surroundings. The driver's state to be recognized includes, for example, physical conditions, degree of vigilance, degree of concentration, degree of fatigue, line-of-sight motion, and driving operation.

The state recognition section 153 supplies data indicative of the results of the recognition processes (including the state recognition map if necessary) to the self-position estimation section 132 and the state prediction section 154. The state recognition section 153 further stores the state recognition map into the storage section 111.

The state prediction section 154 performs processes of predicting the state of the own vehicle on the basis of data or signals from the components of the vehicle control system 100 such as the map analysis section 151, the traffic rule recognition section 152, and the state recognition section 153. For example, the state prediction section 154 performs processes of predicting the state of the own vehicle, the state of the surroundings of the own vehicle, and the state of the driver.

The state of the own vehicle to be predicted includes, for example, the behavior of the own vehicle, occurrence of anomaly, and mileage. The state of the surroundings of the own vehicle to be predicted includes, for example, the behavior of moving objects in the surroundings of the own vehicle, changes of traffic lights, and changes of the environment such as those of the weather. The driver's state to be predicted includes, for example, the behavior and physical conditions of the driver.

The state prediction section 154 supplies data indicative of the results of the prediction processes, along with the data from the traffic rule recognition section 152 and from the state recognition section 153, to the route planning section 161, the action planning section 162, and the operation planning section 163 in the planning section 134.

The route planning section 161 plans the route to the destination on the basis of data or signals from the components of the vehicle control system 100 such as the map analysis section 151 and the state prediction section 154. For example, the route planning section 161 sets the route from the current position to the designated destination on the basis of a global map. As anther example, the route planning section 161 changes the route as needed depending on the state of traffic congestion, accidents, traffic controls, state of road repairing, and the driver's physical conditions. The route planning section 161 supplies data indicative of the planned route to the action planning section 162.

The action planning section 162 plans the actions of the own vehicle for safely traveling the route planned by the route planning section 161 within a planned time period on the basis of data or signals from the components of the vehicle control system 100 such as the map analysis section 151 and the state prediction section 154. For example, the action planning section 162 plans start, stop, advancing directions (e.g., moving forward, moving backward, turning left, turning right, change of direction), driving lanes, traveling speeds, and passing. The action planning section 162 supplies data indicative of the planned actions of the own vehicle to the operation planning section 163.

The operation planning section 163 plans the operation of the own vehicle for implementing the actions planned by the action planning section 162, on the basis of data or signals from the components of the vehicle control system 100 such as the map analysis section 151 and the state prediction section 154. For example, the operation planning section 163 plans acceleration, deceleration, and traveling tracks. The operation planning section 163 supplies data indicative of the planned operation of the own vehicle to an acceleration/deceleration control section 172 and a direction control section 173 in the operation control section 135.

The operation control section 135 controls the operation of the own vehicle. The operation control section 135 includes the emergency avoidance section 171, the acceleration/deceleration control section 172, and the direction control section 173.

The emergency avoidance section 171 performs processes of detecting emergencies such as collision, accidental contact, entry into a hazardous zone, driver's anomaly, and vehicle anomaly on the basis of the detection results from the outside-vehicle information detection section 141, the in-vehicle information detection section 142, and the vehicle state detection section 143. Upon detecting an emergency, the emergency avoidance section 171 plans the operation of the own vehicle to avoid the emergency, such as a sudden stop or a sharp turn. The emergency avoidance section 171 supplies data indicative of the planned operation of the own vehicle to the acceleration/deceleration control section 172 and the direction control section 173.

The acceleration/deceleration control section 172 performs acceleration/deceleration control for implementing the operation of the own vehicle planned by the operation planning section 163 or by the emergency avoidance section 171. For example, the acceleration/deceleration control section 172 calculates control target values for the drive power generation apparatus or for the braking apparatus to achieve the planned acceleration, deceleration, or sudden stop. The acceleration/deceleration control section 172 supplies a control command indicative of the calculated control target values to the driving system control section 107.

The direction control section 173 performs direction control for implementing the operation of the own vehicle planned by the operation planning section 163 or by the emergency avoidance section 171. For example, the direction control section 173 calculates control target values for the steering mechanism to attain the traveling track or execute the sharp turn as planned by the operation planning section 163 or by the emergency avoidance section 171. The direction control section 173 supplies a control command indicative of the calculated control target values to the driving system control section 107.

Figure 19:
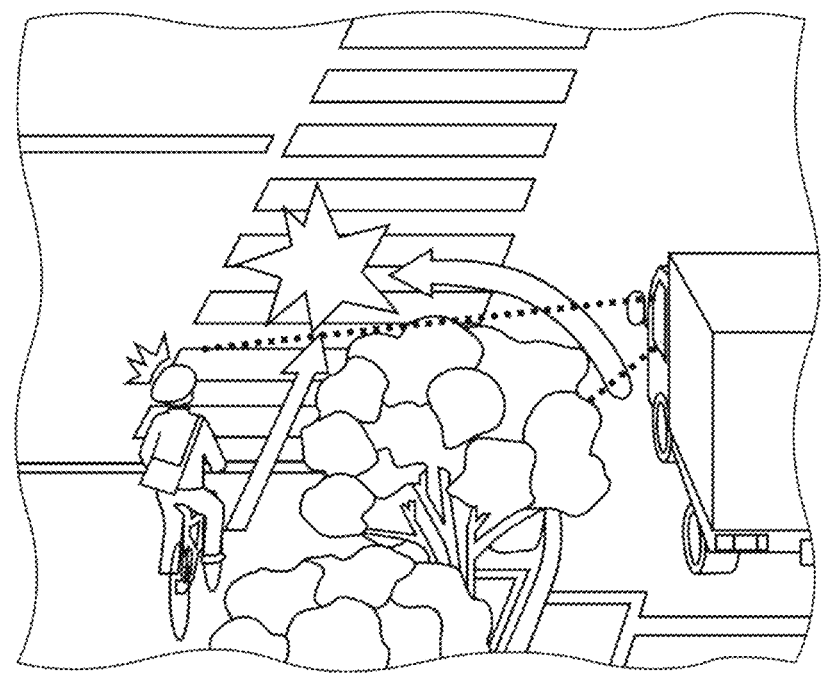
FIG. 19 is a view depicting how a bicycle running on the sidewalk in parallel with a vehicle collides with the latter making a turn at a traffic intersection.

Day or night, numerous accidents occur in which runners or bicycles running on the sidewalk in parallel with vehicles come to the intersection where they get hit by vehicle. One reason for such accidents to take place is that where the driveway and the sidewalk are separated from each other by roadside trees or by railings, it is difficult to detect pedestrians on the sidewalk from the vehicle side. Where the driveway and the sidewalk are separated from each other by roadside trees as depicted in FIG. 19, the sidewalk is hidden by the trees. It is thus difficult for the vehicle side to detect pedestrians walking or bicycles running on the sidewalk until the roadside trees end at the intersection. In particular, in a case where a runner or a bicycle is running in parallel with a vehicle, it is difficult for the vehicle side to recognize the presence of the runner or the bicycle until they reach the intersection at which a collision accident can likely occur between them.

For that reason, techniques have been developed using visible light cameras or distance sensors on board the vehicle to detect humans or obstacles in front of the vehicle so as to avert such obstacles by applying automatic brakes (as described above).

However, when a human on the side of the road is to be detected using a visible light camera, the human as a whole may not be visible due to roadside trees acting as obstacles. This reduces the accuracy of detecting humans. In particular, where the roadside trees are densely planted so that human ranges are poorly visible from the own vehicle, human detection may not be successful. Humans may or may not be detected from one frame to another. Further, depending on the relations between roadside trees and pedestrians, the range in which the same human can be detected varies from one frame to another. This makes it difficult to obtain the corresponding relations of the same human between multiple frames. The resulting difficulty in estimating the motion of that human can in turn make it difficult to determine the risk of that human colliding with the own vehicle.

Meanwhile, distance sensors such as millimeter-wave radar, LiDAR, and ultrasonic sensors are capable of measuring the distance to a given target. However, in a case where obstacles such as roadside trees exist between the target human and the own vehicle, it is difficult for the sensors to separate the roadside trees from the human or to determine which of the separated ranges is the human range.

For example, a vehicle surrounding monitoring apparatus has been proposed that prevents false detection of a monitoring target through image processing in a situation where there are obstacles between the camera and the monitoring target (e.g., see PTL 1). Whereas this vehicle surrounding monitoring apparatus is configured to recognize objects by image capture with a visible light camera within a range recognized by radar, an obstacle such as a wall between the monitoring target and the camera could be falsely recognized as the monitoring target. To prevent such false recognition, this vehicle surrounding monitoring apparatus obtains the degree of complexity of the image from the camera and, if the obtained complexity differs from the expected complexity of the target, determines that there is an obstacle. However, although using the degree of complexity of the target as means for distinguishing it from obstacles permits identification of flat obstacles such as walls, resorting to the complexity may not be effective for distinguishing complicated obstacles such as roadside trees.

Also, a human detection apparatus has been proposed that groups, by suitable distance, multiple ranges corresponding to human body temperatures and determines whether the grouped ranges constitute a human by area and by shape (e.g., see PTL 2). This human detection apparatus permits human detection even if an entire human fails to fall within an appropriate temperature range due to changes in the environment or in clothing. This human detection apparatus is configured to determine whether there are humans from multiple ranges within a single far-infrared ray image. However, it is feared that if obstacles have too wide an area to permit sufficient ranges for human detection, the accuracy of the determination may significantly drop.

Further, a pedestrian detection and warning apparatus has been proposed that extracts ranges of human faces and hands with both a visible light camera and a far-infrared ray camera for capturing the same target, binarizing what is captured using their respective evaluation values and obtaining the difference therebetween (e.g., see PTL 3). If human ranges were determined using solely temperature information from far-infrared ray images, ranges with temperatures close to human body temperature such as taillights could be falsely included. This pedestrian detection and warning apparatus is configured to correctly distinguish human ranges using visible light. Whereas the pedestrian detection and warning apparatus needs to extract human ranges by two methods involving far-infrared rays and visible light, it is feared that the presence of obstacles with complex textures such as roadside trees may disable both methods of human detection.

Thus, what is disclosed hereunder in this description is an image processing apparatus that suitably detects desired objects such as humans from among obstacles of complex textures including roadside trees by combining processes on images captured by both a visible light camera and a far-infrared ray camera observing the same target.

Figure 2:
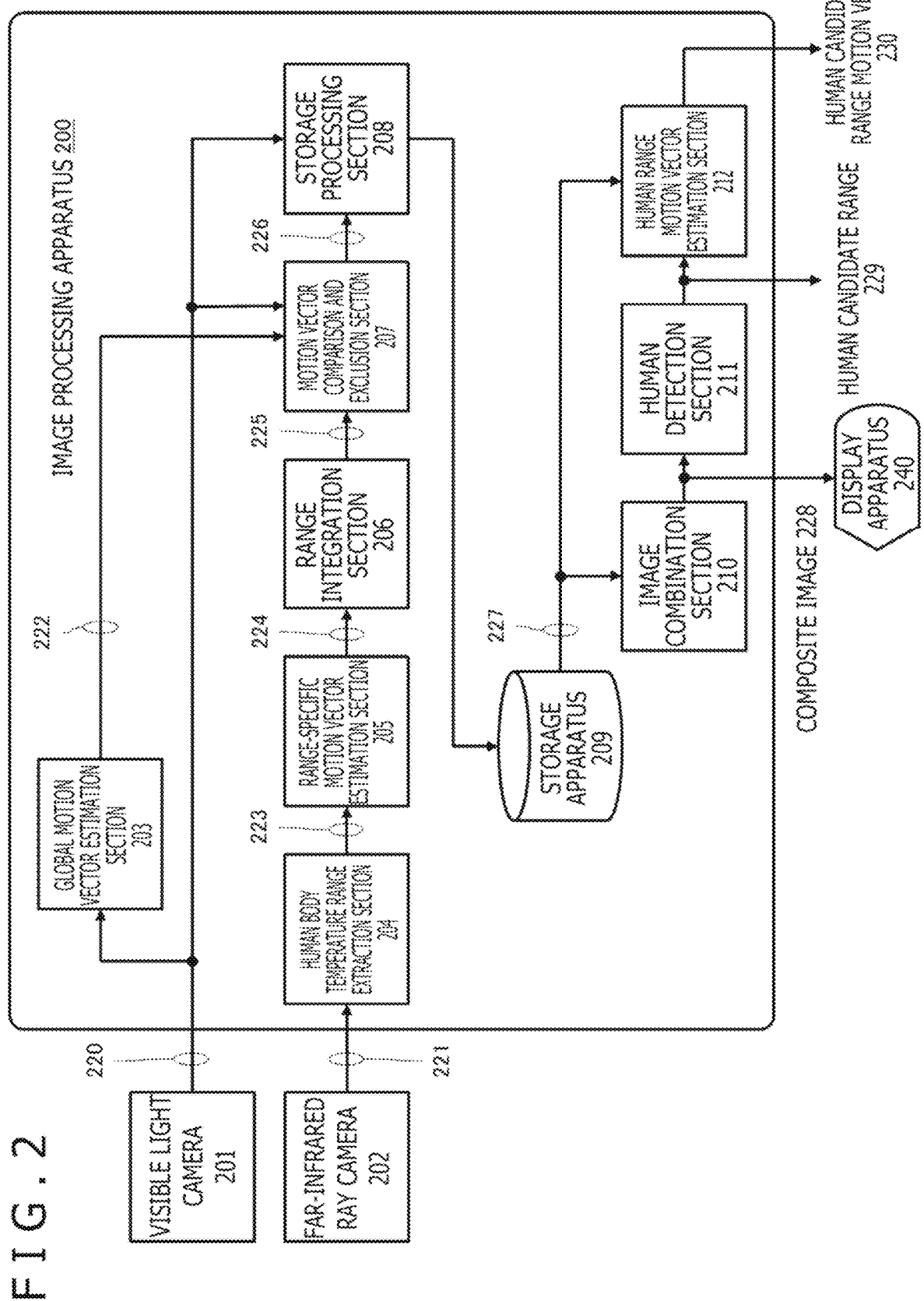
FIG. 2 is a view depicting an exemplary functional configuration of an image processing apparatus 200.

FIG. 2 schematically depicts a functional configuration of an image processing apparatus 200 to which the technology disclosed in this description is applied. The image processing apparatus 200 may be included in the vehicle control system 100 depicted in FIG. 1 as one component of the automated driving control section 112, for example. Below is a detailed explanation of the functions of the components in the image processing apparatus 200.

A visible light camera 201 and a far-infrared ray camera 202 are installed in such a manner as to observe the same target. A visible light image 220 captured by the visible light camera 201 and a far-infrared ray image 221 captured by the far-infrared ray camera 202 are both input to the image processing apparatus 200. An image that includes large amounts of heat information at long wavelengths near 10 micrometers, for example, may be captured as the far-infrared ray image 221, from which temperature ranges close to human body temperatures may be extracted.

The visible light camera 201 and the far-infrared ray camera 202 are mounted on board the vehicle, for example. The image processing apparatus 200 is expected to be mounted on the vehicle as well. In the example depicted in FIG. 2, the visible light camera 201 and the far-infrared ray camera 202 are externally connected to the image processing apparatus 200. Alternatively, an apparatus configuration is envisaged in which at least either the visible light camera 201 or the far-infrared ray camera 202 is integrated with the image processing apparatus 200. Further, the visible light camera 201 and the far-infrared ray camera 202 are expected to be included as components of the data acquisition section 102 in the vehicle control system 100 in FIG. 1.

The image processing apparatus 200 includes a global motion vector estimation section 203, a human body temperature range extraction section 204, a range-specific motion vector estimation section 205, a range integration section 206, a motion vector comparison and exclusion section 207, a storage processing section 208, a storage apparatus 209, an image combination section 210, a human detection section 211, and a human range motion vector estimation section 212.

Given the visible light image 220 of multiple continuous frames input from the visible light camera 201, the global motion vector estimation section 203 obtains a global motion vector 222 indicative of an independent motion of the image (i.e., how the entire image has moved on the screen).

Meanwhile, from the far-infrared ray image 221 input from the far-infrared ray camera 202, the human body temperature range extraction section 204 extracts, as human body temperature ranges, the ranges of pixels masked with possible human body temperatures (i.e., within ranges of possible temperatures of the human body). It is to be noted that, in a case where the image processing apparatus 100 is desired to be used for performing similar processing on a target other than humans, a specific temperature range extraction section configured to extract the range of pixels with values falling within a temperature range characteristic of the specific target may be included in place of the human body temperature range extraction section 204 in the image processing apparatus 100.

The range-specific motion vector estimation section 205 obtains a motion vector indicative of the motion of each human body temperature range (i.e., how each human body temperature range has moved on the screen) from a far-infrared ray image 223 of multiple continuous frames from which the human body temperature ranges have been extracted. The range-specific motion vector estimation section 205 then outputs a far-infrared ray image 224 indicative of motion vector-added human body temperature ranges.

The range integration section 206 compares the motion vectors of multiple motion vector-added human body temperature ranges included in the far-infrared ray image 224. By so doing, the range integration section 206 integrates human body temperature ranges having motion vectors close to each other by at least a predetermined degree to generate integrated ranges. Here, the vectors "similar to each other by at least a predetermined degree" mean that two vectors, for example, form an angle no larger than a predetermined angle (the same applies hereunder). The range integration section 206 then integrates groups of motion vectors of the human body temperature ranges included in the integrated ranges, calculates the motion vector of each of the integrated ranges, and outputs a far-infrared ray image 225 indicative of the motion vector-added integrated ranges. For example, motion vectors may be integrated by calculating an average of the motion vectors forming a group.

In the far-infrared ray image 221 observing humans behind obstacles such as roadside trees and railings, the same human body is expected to be fragmented into multiple human body temperature ranges. If such human body temperature ranges belong to the same human body, their motion vectors are expected to be close to each other by at least a predetermined degree. On that assumption, the range integration section 206 identifies the human body temperature ranges having motion vectors close to each other by at least a predetermined degree as belonging to the same person and integrates accordingly.

Incidentally, the range integration section 206 should additionally employ a range-integrating condition stipulating that the human body temperature ranges are to be close to each other in terms of distance, in addition to the condition prescribing that the motion vectors are to be close to each other by at least a predetermined degree. That is because the human body temperature ranges separated at least a predetermined distance apart are highly likely to belong to different persons (e.g., two runners running side by side on the sidewalk) and should not be integrated.

The motion vector comparison and exclusion section 207 compares the motion vector of each of the motion vector-added integrated ranges included in the far-infrared ray image 225 input from the range integration section 206 with the global motion vector 222 input from the global motion vector estimation section 203. The motion vector comparison and exclusion section 207 then excludes the integrated ranges having motion vectors close to the global motion vector 222 by at least a predetermined degree from the motion vector-added integrated ranges in the far-infrared ray image 225. By so doing, the motion vector comparison and exclusion section 207 leaves intact only the motion vector-added integrated ranges having motion vectors different from the global motion vector 222. The motion vector comparison and exclusion section 207 then obtains the motion vector of the remaining motion vector-added integrated range as a whole, i.e., an integrated range motion vector.

The motion vector-added integrated ranges having motion vectors close to the global motion vector 222 by at least a predetermined degree follow the motion of the entire image on the screen. That is, these motion vector-added integrated ranges constitute images of motionless objects (humans) and do not represent obstacles that may likely collide. Thus, on the basis of the result of comparison between the global motion vector 222 and the other motion vectors, the motion vector comparison and exclusion section 207 estimates the motion vector-added integrated ranges assumed to belong to motionless objects and excludes these ranges from the far-infrared ray image 225.

Incidentally, the motion vectors of the human body temperature ranges of objects (humans) moving in the opposite direction of the vehicle carrying the visible light camera 201 and the far-infrared ray camera 202 are also expected to be close to the global motion vector 222 by at least a predetermined degree. Although these objects are unlikely to collide with the vehicle, the motion vector comparison and exclusion section 207 can also be excluded from the motion vector-added integrated ranges based on the result of comparison with the global motion vector 222.

The motion vector comparison and exclusion section 207 further integrates the remaining integrated ranges to generate excluded integrated ranges and calculates the motion vectors of the remaining integrated ranges by integrating the motion vectors of the remaining integrated ranges. Also, the motion vector comparison and exclusion section 207 receives input of the visible light image 220 acquired by the visible light camera 201, and extracts from the visible light image 220 visible light ranges corresponding to the human body temperature ranges in the excluded integrated ranges so as to generate visible light motion ranges. For example, the motion vector comparison and exclusion section 207 extracts the visible light motion ranges corresponding to the remaining human body temperature ranges by masking the visible light image 220 with non-zero ranges (human body temperature ranges) in the excluded integrated ranges (the visible light motion ranges are equivalent to corresponding visible light ranges in the visible light image replacing the remaining human body temperature ranges in the excluded integrated ranges). The reason for masking the visible light image from the excluded integrated ranges is so that the human detection section 211 configured downstream will detect humans more accurately using visible light images having larger amounts of information than far-infrared ray images.

In such a manner described above, the motion vector comparison and exclusion section 207 ultimately obtains visible light motion ranges formed by the visible light images of the remaining human body temperature ranges, and motion vector-added visible light motion ranges 226 constituted by the integrated range motion vectors of the remaining human body temperature ranges as a whole.

The storage processing section 208 stores into the storage apparatus 209 the motion vector-added visible light motion ranges 226 of multiple frames constituted by the visible light motion ranges and by the integrated range motion vectors. The reason for storing the motion vector-added visible light motion ranges 226 of multiple frames is so that the image combination section 210 configured downstream will combine the ranges in the time direction into an image.

Alternatively, motion vector-added excluded integrated ranges formed not by visible light images but by far-infrared ray images and by integrated range motion vectors may be stored into the storage apparatus 209. Whereas visible light images include large amounts of information such as textures and colors during daylight or in the case where the target is illuminated, far-infrared ray images include more information at night or under poor illumination. Thus, the storage processing section 208 may selectively store into the storage apparatus 209 the motion vector-added visible light motion ranges or the motion vector-added excluded integrated ranges depending on such information as the time zone in which the visible light camera 201 and the far-infrared ray camera 202 did their imaging or the ambient light outside the vehicle. As another alternative, the storage processing section 208 may store both the motion vector-added visible light motion ranges and the motion vector-added excluded integrated ranges into the storage apparatus 209.

Also, the visible light image (moving image) 220 captured by the visible light camera 201 may be stored into the storage apparatus 209 (i.e., acting as a drive recorder). The storage apparatus 209 may be configured, for example, using a mass storage device such as SSD or HDD. Besides being incorporated in the image processing apparatus 200, the storage apparatus 209 may be configured to be externally attached to the image processing apparatus 200.

The image combination section 210, the human detection section 211, and the human range motion vector estimation section 212 configured downstream retrieve from the storage apparatus 209 the motion vector-added visible light motion ranges 227 of multiple frames continued in the time direction, and process what is retrieved to detect humans and to estimate their motions for avoidance of collision with the vehicle.

In a case where both the motion vector-added visible light motion ranges and the motion vector-added excluded integrated ranges are stored in the storage apparatus 209, either the motion vector-added visible light motion ranges or the motion vector-added excluded integrated ranges may be selectively retrieved from the storage apparatus 209 for latter-half processing depending on such information as the time zone in which the visible light camera 201 and the far-infrared ray camera 202 did their imaging or the ambient light outside the vehicle. For example, in the case where the time is determined to be daytime, the motion vector-added visible light motion ranges are used; where the time is determined to be nighttime, the motion vector-added excluded integrated ranges are employed. The human detection section 211 switches to and utilizes a dictionary corresponding to the motion vector-added visible light motion ranges or to the motion vector-added excluded integrated ranges. In the description that follows, for the purpose of simplification, the latter-half processing will be explained using solely the motion vector-added visible light motion ranges 227.

Upon retrieving from the storage apparatus 209 the motion vector-added visible light motion ranges 227 of multiple frames continued in the time direction, the image combination section 210 corrects the positions of the visible light motion ranges on the screen based on motion vector information regarding the motion vector-added visible light motion range 227 of each frame, and combines the visible light motion ranges in the time direction to generate a composite image 228. Specifically, the visible light motion range obtained from each frame is positionally corrected using an inverse vector of its integrated range motion vector so that the visible light motion range will remain positionally unchanged on the screen from one frame to another (i.e., in the time direction). The images thus obtained from multiple frames are combined into a single image. In this manner, the foreground (obstacles such as roadside trees) is excluded and the target (humans) forming the background is reconstructed to its original shape. The image combination section 210 may cause a display apparatus 240 to display on its screen the composite image thus generated, besides outputting the image to the human detection section 211 configured downstream. The display apparatus 240 may be either externally connected to the image processing apparatus 100 or incorporated in the image processing apparatus 100 as one of its components. The display apparatus 240 may be included in the output section 106 of the vehicle control system 100 depicted in FIG. 1.

The human detection section 211 generates human candidate ranges 229 by performing a human detection process on the composite image 228 input from the image combination section 210. The human detection section 211 carries out the human detection process (to be discussed later) through the use of machine learning, for example. The human detection section 211 may output information regarding the generated human candidate ranges 229 to the outside of the image processing apparatus 200, in addition to outputting the information to the human range motion vector estimation section 212 configured downstream.

Given the human candidate ranges 229 input from the human detection section 211 and the motion vectors of the motion vector-added visible light motion ranges 227 of multiple frames retrieved from the storage apparatus 209, the human range motion vector estimation section 212 estimates a human candidate range motion vector 230 indicative of the motion of the human candidate ranges as a whole. For example, the human range motion vector estimation section 212 calculates the human candidate range motion vector from an average of the motion vectors of the excluded integrated ranges 226 over multiple frames and from an average of the motion vectors of the human candidate ranges 229. If the human position estimated by the human candidate range motion vector is determined to be likely to coincide with the vehicle position following a predetermined time period, the image processing apparatus 200 may be caused to warn of the risk of collision.

Figure 3:
FIG. 3 is a view depicting an exemplary visible light image captured by a visible light camera 201.
Figure 4:
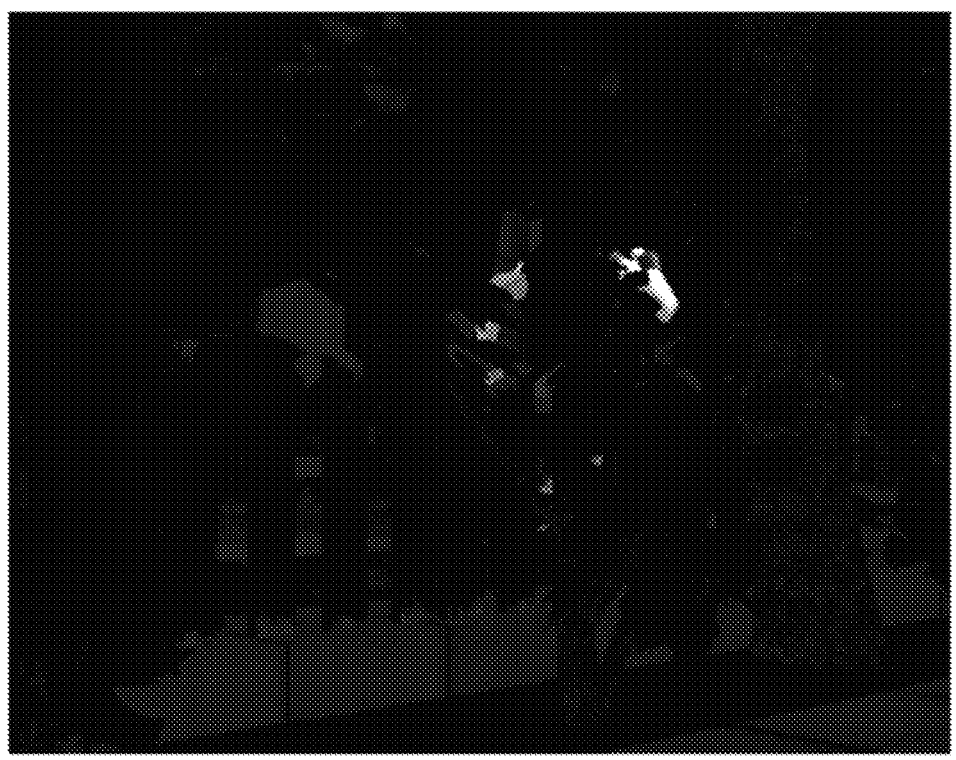
FIG. 4 is a view depicting an exemplary far-infrared ray image captured by a far-infrared ray camera 202.

FIG. 3 depicts an exemplary visible light image captured by the visible light camera 201, and FIG. 4 illustrates an exemplary far-infrared ray image captured by the far-infrared ray camera 202. It is to be noted that the visible light camera 201 and the far-infrared ray camera 202 observe the same target. In the exemplary visible light image depicted in FIG. 3, there are roadside trees and a person seen therethrough. In this case, the roadside trees are the obstacles that make it difficult to distinguish the human presence. In the far-infrared ray image depicted in FIG. 4, on the other hand, extracting temperature ranges close to the human body temperature clearly delineates multiple apparently human ranges. In the case where observation is performed across roadside trees as depicted in FIG. 3, the human body is partially hidden by the trees. Thus, as illustrated in FIG. 4, the body of a single person is fragmented into multiple ranges when extracted.

Figure 5:
FIG. 5 is a view depicting an exemplary global motion vector estimated from the visible light image.

FIG. 5 depicts an exemplary global motion vector indicative of an independent motion of the image obtained by the global motion vector estimation section 203 from the visible light image. What is depicted here is a global motion vector estimated by the global motion vector estimation section 203 from multiple continuous frames including the visible light image illustrated in FIG. 3. In FIG. 5, a large hollow arrow indicated by reference numeral 401 designates the global motion vector that indicates how the entire image has moved on the screen.

Figure 6:
FIG. 6 is a view depicting exemplary human body temperature ranges extracted from the far-infrared ray image.

FIG. 6 depicts exemplary human body temperature ranges extracted by the human body temperature range extraction section 204 from the far-infrared ray image in FIG. 4. The human body temperature range extraction section 204 obtains the human body temperature ranges masked with possible human body temperatures from the far-infrared ray image 221 input from the far-infrared ray camera 202. In FIG. 6, multiple ranges enclosed by white rectangles correspond to the human body temperature ranges. In the case where observation is performed across roadside trees as depicted in FIG. 3, the human body is partially hidden by the trees. Thus, the body of a single person is fragmented into multiple ranges when extracted.

Figure 7:
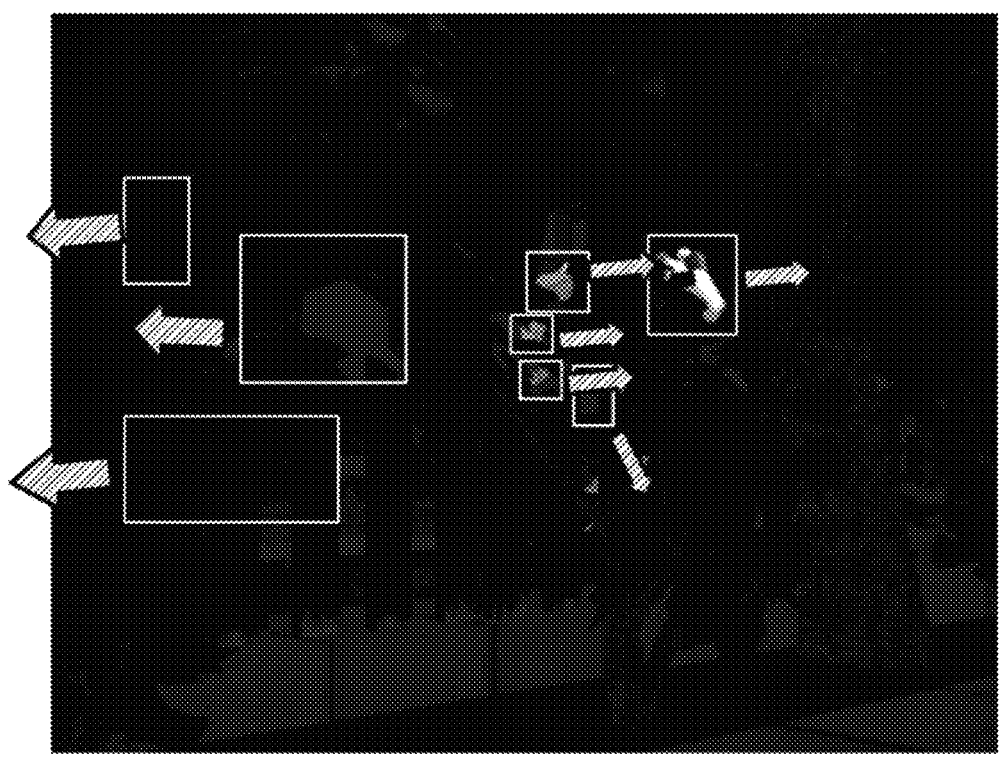
FIG. 7 is a view depicting an exemplary far-infrared ray image indicative of motion vector-added human body temperature ranges.

FIG. 7 depicts an exemplary far-infrared ray image indicative of motion vector-added human body temperature ranges output from the range-specific motion vector estimation section 205. The range-specific motion vector estimation section 205 obtains motion vectors indicative of how each human body temperature range has moved on the screen, from the far-infrared ray image of multiple continuous frames from which the human body temperature ranges have been extracted. In FIG. 7, small shaded arrows attached to the human body temperature ranges delimited by white rectangles represent the motion vector estimated for each of the human body temperature ranges.

Figure 8:
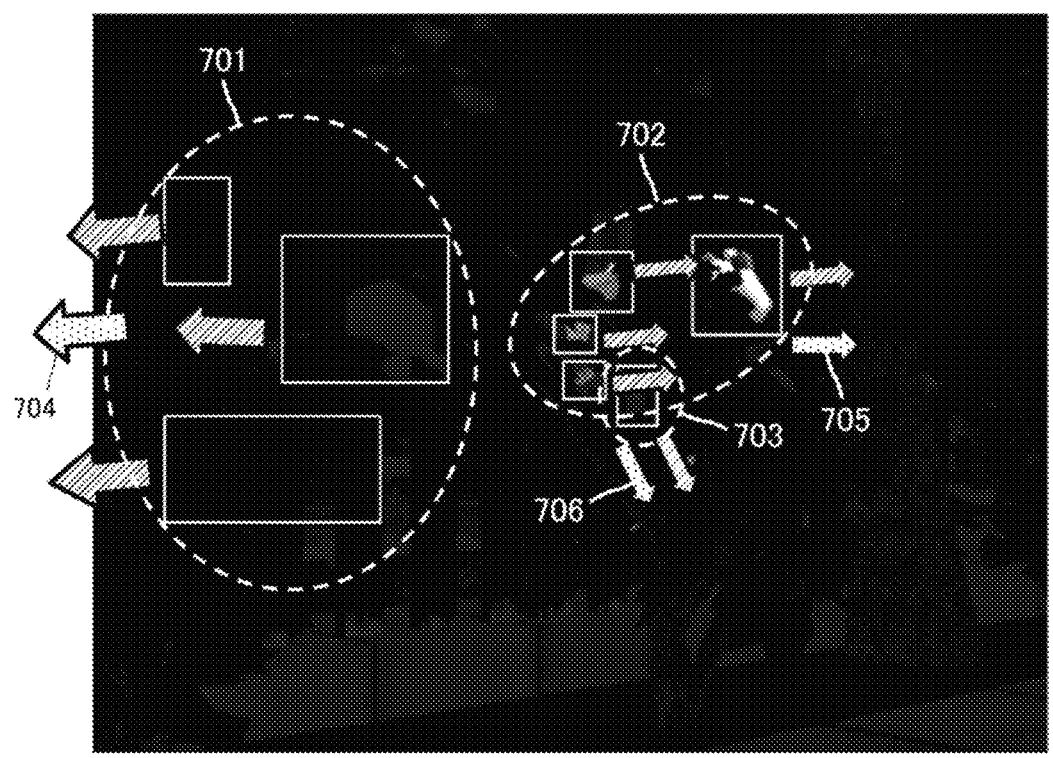
FIG. 8 is a view depicting exemplary integrated ranges each integrating human body temperature ranges having motion vectors close to each other and a motion vector of each of the integrated ranges.

The range integration section 206 compares the motion vectors of multiple motion vector-added human body temperature ranges included in the far-infrared ray image 224. By so doing, the range integration section 206 integrates human body temperature ranges having motion vectors close to each other by at least a predetermined degree to generate integrated ranges. At the same time, the range integration section 206 obtains motion vector-added integrated ranges by calculating the motion vector of each of the integrated ranges from a group of motion vectors of the human body temperature ranges included in the integrated ranges. FIG. 8 depicts motion vector-added integrated ranges obtained by the range integration section 206 performing a range integration process on the far-infrared ray image indicative of the motion vector-added temperature ranges in FIG. 7, as well as exemplary motion vectors of the motion vector-added integrated ranges. In FIG. 8, the ranges enclosed by dotted lines and indicated by reference numerals 701, 702, and 703 represent the motion vector-added integrated ranges. A dot-filled arrow attached to the motion vector-added integrated range 701 and indicated by reference numeral 704 represents a motion vector that integrates a group of the motion vectors of the human body temperature ranges included in the motion vector-added integrated range 701. Likewise, dot-filled arrows attached to the motion vector-added integrated ranges 702 and 703 and indicated by reference numerals 705 and 706 respectively represent the motion vectors of the motion vector-added integrated ranges 702 and 703.

In the case where observation is performed across roadside trees as depicted in FIG. 3, the human body is partially hidden by the trees. The body of a single person is thus fragmented into multiple ranges when extracted. Since the human temperature ranges of the same person manifest approximately the same motion, the temperature ranges having motion vectors close to each other by at least a predetermined degree are estimated to belong to the same person. That is the reason why, as depicted in FIG. 8, the human body temperature ranges having vectors close to each other by at least a predetermined degree can be integrated and grouped by human temperature range into the motion vector-added integrated ranges 701, 702, and 703.

Figure 9:
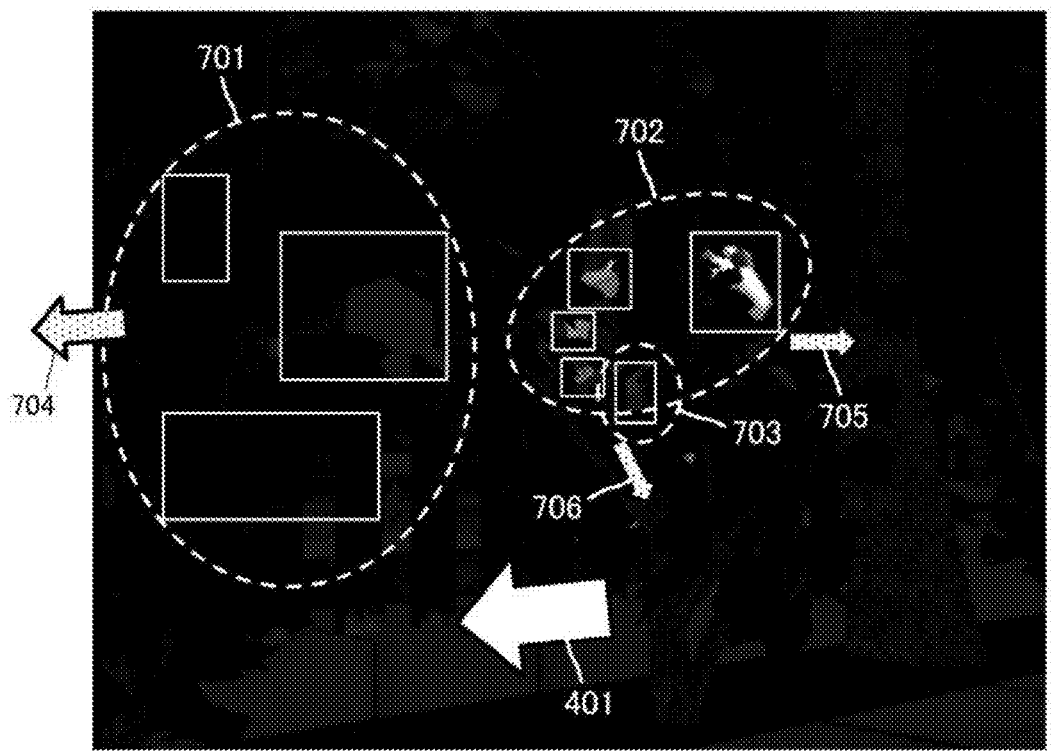
FIG. 9 is a view depicting an example of how the motion vectors of the integrated ranges are compared with the global motion vector.
Figure 10:
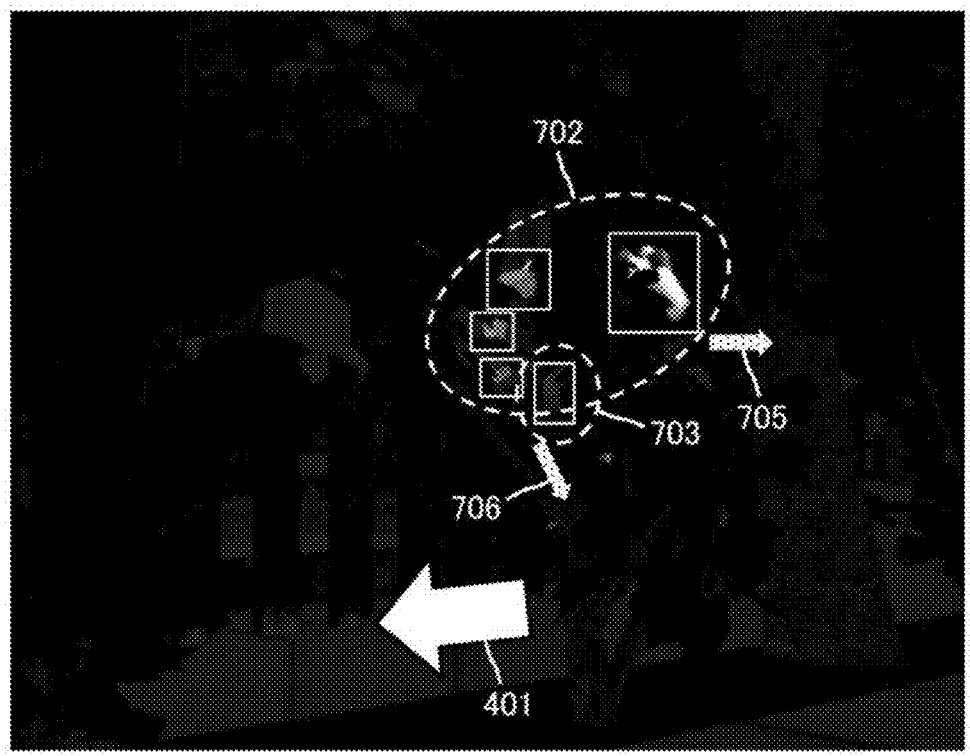
FIG. 10 is a view depicting an exemplary result of excluding an integrated range having a motion vector similar to the global motion vector.

The motion vector comparison and exclusion section 207 compares the motion vector of each of the motion vector-added integrated ranges with the global motion vector input from the global motion vector estimation section 203, thereby excluding the integrated ranges having motion vectors close to the global motion vector by at least a predetermined degree from the motion vector-added integrated ranges. FIG. 9 depicts how the motion vectors 704, 705, and 706 of the motion vector-added integrated ranges 701, 702, and 703 are compared with the global motion vector 401. FIG. 10 depicts the result of excluding the motion vector-added integrated ranges having motion vectors close to the global motion vector by at least a predetermined degree. As can be understood from FIG. 10, the human body temperature ranges included in the vector-added integrated range 701 having the motion vector 704 close to the global motion vector 401 by at least a predetermined degree are excluded. On the other hand, the vector-added integrated ranges 702 and 703 with the motion vectors 705 and 706 different from the global motion vector 401 are allowed to remain.

Figure 11:
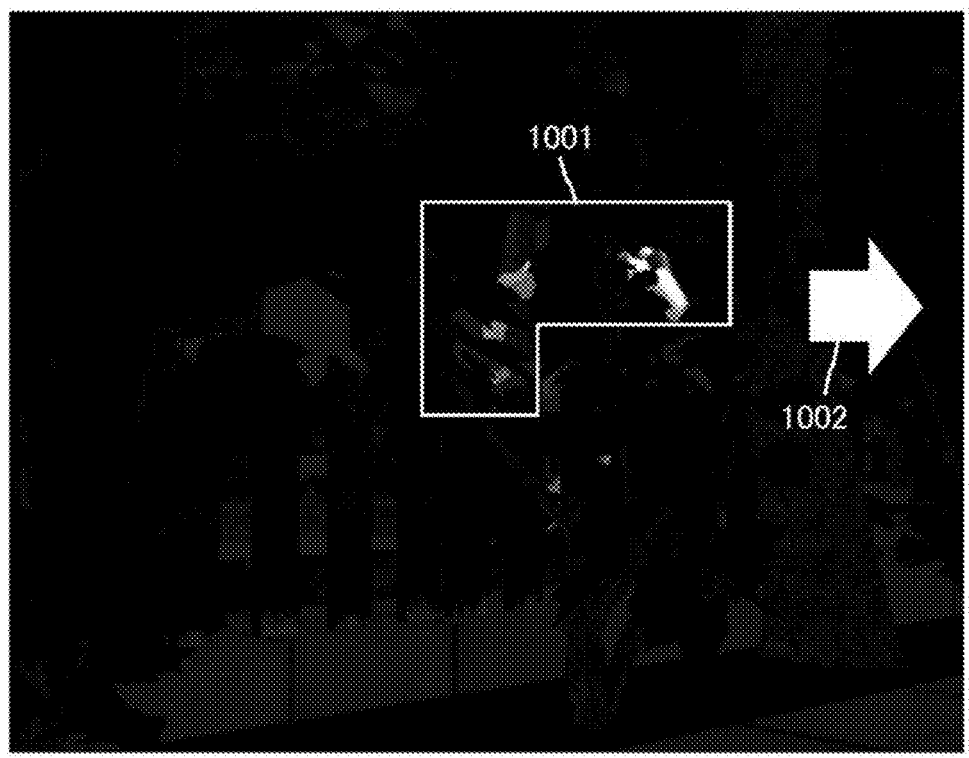
FIG. 11 is a view depicting an exemplary excluded integrated range and its motion vector.

The motion vector comparison and exclusion section 207 further integrates the remaining integrated ranges to generate an excluded integrated range. At the same time, the motion vector comparison and exclusion section 207 calculates the motion vector of the excluded integrated range by integrating the motion vectors of the remaining integrated ranges. FIG. 11 depicts an exemplary excluded integrated range 1001 that integrates the remaining integrated ranges 702 and 703 in FIG. 10, and an exemplary motion vector 1002 of the excluded integrated range 1001 integrating the motion vectors of the integrated ranges 702 and 703.

Figure 12:
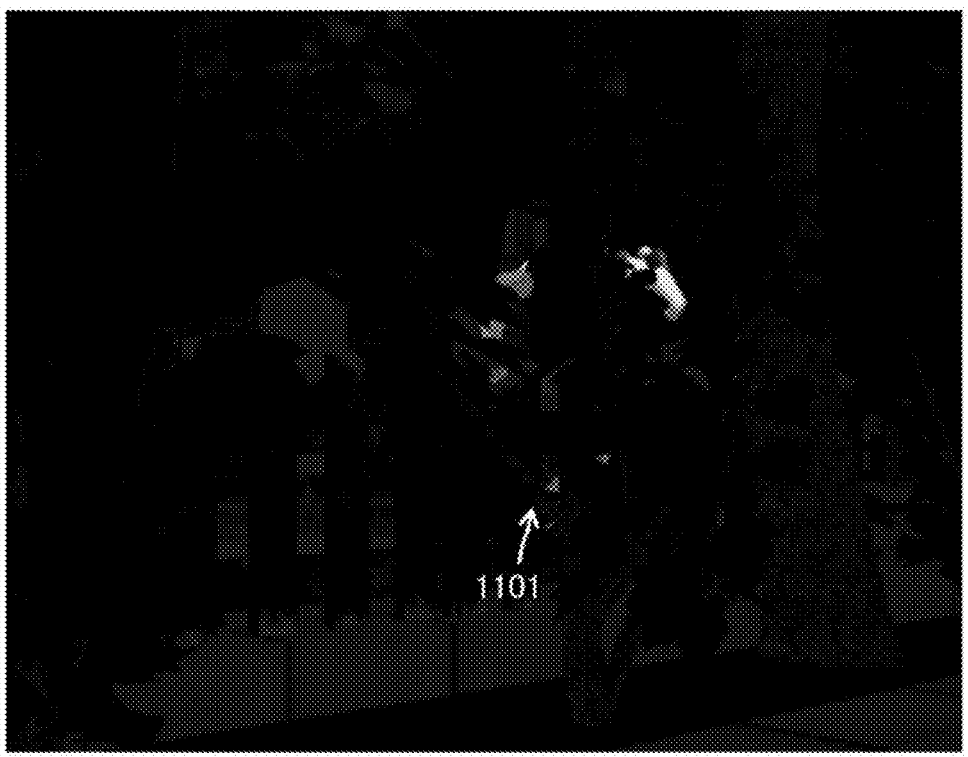
FIG. 12 is a view depicting an exemplary visible light motion range.

Furthermore, the motion vector comparison and exclusion section 207 masks the visible light image input from the visible light camera 201 with non-zero pixel value ranges in the excluded integrated range 1001 (i.e., human body temperature ranges in the excluded integrated range) so as to generate visible light motion ranges formed by the visible light ranges corresponding to the human body temperature ranges in the excluded integrated range. FIG. 12 depicts an exemplary visible light motion range 1101 constituted by the visible light ranges corresponding to the human body temperature ranges in the excluded integrated range. The reason for masking the visible light image from the excluded integrated range is so that the human detection section 211 configured downstream will detect humans more accurately using visible light images having larger amounts of information than far-infrared ray images.

The storage processing section 208 stores into the storage apparatus 209 motion vector-added visible light motion ranges of multiple frames constituted by visible light motion ranges such as one in FIG. 12 and by motion vectors such as one in FIG. 11. The reason for storing the motion vector-added visible light motion ranges of multiple frames is so that the image combination section 210 configured downstream may combine the ranges in the time direction into an image. During daylight or in the case where the target is illuminated, visible light images include large amounts of information such as textures and colors. At night or under poor illumination, on the other hand, far-infrared ray images include more information. Thus, the storage processing section 208 may be controlled to selectively store into the storage apparatus 209 either the motion vector-added visible light motion ranges or the motion vector-added excluded integrated ranges depending on such information as the time zone in which the visible light camera 201 and far-infrared ray camera 202 did their imaging or the ambient light outside the vehicle. As another alternative, the storage processing section 208 may store both the motion vector-added visible light motion ranges and the motion vector-added excluded integrated ranges into the storage apparatus 209.

The image combination section 210, the human detection section 211, and the human range motion vector estimation section 212 configured downstream retrieve from the storage apparatus 209 motion vector-added visible light motion ranges of multiple frames continued in the time direction, and process what is retrieved so as to detect humans and to estimate their motions for avoidance of collision with the vehicle. In the case where both the motion vector-added visible light motion ranges and the motion vector-added excluded integrated ranges are stored in the storage apparatus 209, either the motion vector-added visible light motion ranges or the motion vector-added excluded integrated ranges may be selectively retrieved for use from the storage apparatus 209 depending on such information as the time zone in which the visible light camera 201 and the far-infrared ray camera 202 did their imaging or the ambient light outside the vehicle. For example, in the case where the time is determined to be daytime, the motion vector-added visible light motion ranges are used; where the time is determined to be nighttime, the motion vector-added excluded integrated ranges are utilized. The human detection section 211 switches to and utilizes the dictionary corresponding to the motion vector-added visible light motion ranges or to the motion vector-added excluded integrated ranges. In the description that follows, for the purpose of simplification, the latter-half processing will be explained using solely the motion vector-added visible light motion ranges 227.

Figure 13:
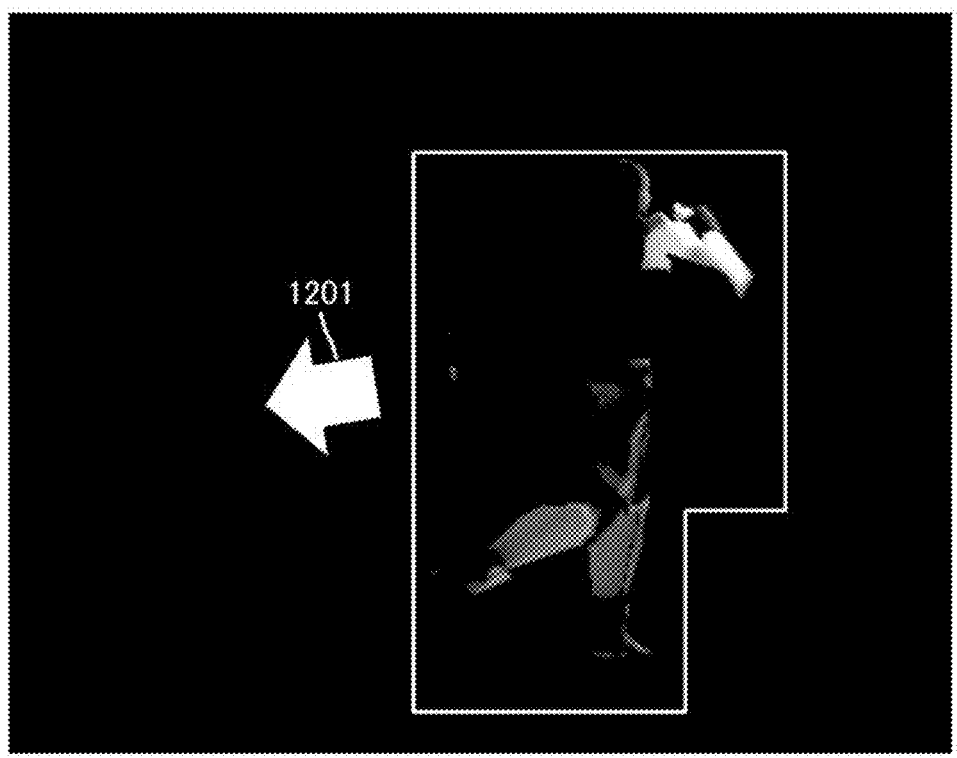
FIG. 13 is a view depicting an example of correcting the position of the visible light motion range using an inverse vector of an integrated range motion vector.

Upon retrieving from the storage apparatus 209 the motion vector-added visible light motion ranges of multiple frames continued in the time direction, the image combination section 210 corrects the positions of the visible light motion ranges on the screen based on their motion vector information in such a manner that the visible light motion ranges will remain positionally unchanged in the time direction on the screen. FIG. 13 depicts how the visible light motion range obtained from each frame is positionally corrected using an inverse vector 1201 of the integrated range motion vector of each visible light motion range so that the visible light motion range will remain positionally unchanged on the screen.

Figure 14:
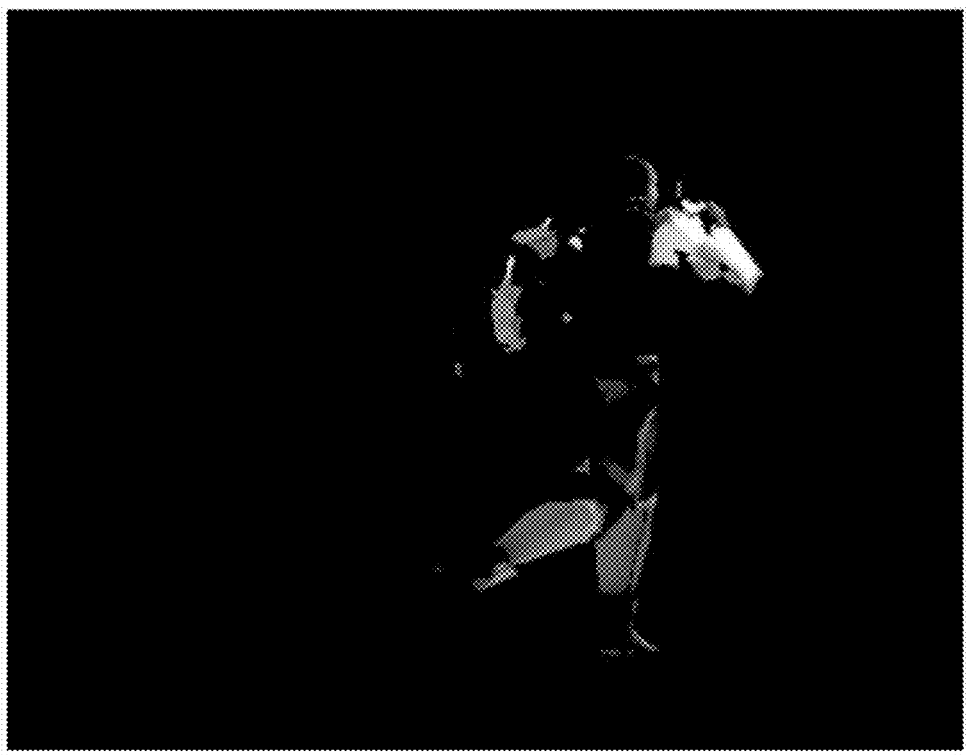
FIG. 14 is a view depicting an exemplary result of combining multiple frame images obtained by position correction into a single image.

The image combination section 210 then combines multiple positionally corrected visible light images into a composite image. FIG. 14 depicts the result of combining multiple frame images obtained by position correction into a single image. As can be understood from FIG. 14, combining positionally corrected multiple frames makes it possible to exclude the foreground and to reconstruct the target (humans) forming the background to its original shape for extraction. That is, whereas a single frame permits observation of only parts of the target hidden by obstacles such as roadside trees, extracting multiple frame images and combining them in the time direction generates a whole image of the target captured as the background.

Figure 15:
FIG. 15 is a view depicting an exemplary human candidate range extracted from the composite image in FIG. 14.

The human detection section 211 generates human candidate ranges by performing the human detection process on the composite image input from the image combination section 210. FIG. 15 depicts an exemplary human candidate range 1401 extracted from the composite image in FIG. 14.

Figure 16:
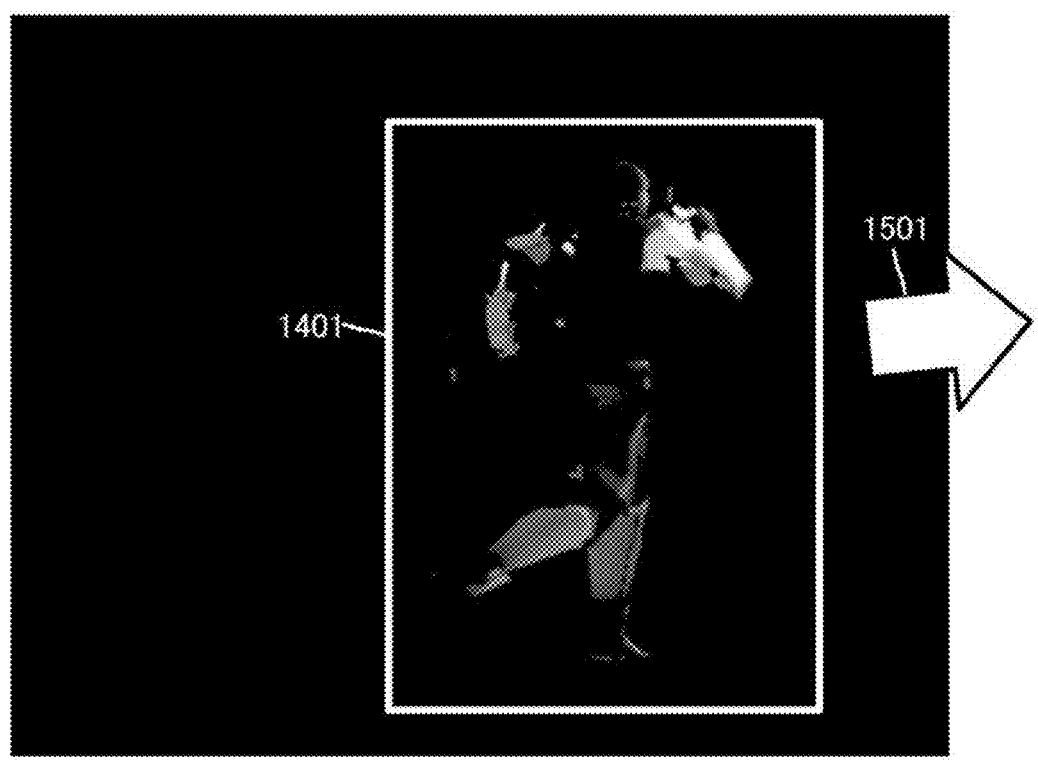
FIG. 16 is a view depicting an example of a human candidate range motion vector 1501 estimated with regard to the human candidate range.

The human range motion vector estimation section 212 estimates a human candidate range motion vector indicative of the motion of the human candidate ranges as a whole from the human candidate ranges input from the human detection section 211 and from the motion vectors of the motion vector-added visible light motion ranges of multiple frames retrieved from the storage apparatus 209. For example, the human range motion vector estimation section 212 calculates the human candidate range motion vector from an average of the motion vectors of the excluded integrated ranges over multiple frames and from an average of the motion vectors of the human candidate ranges over multiple frames. FIG. 16 depicts an exemplary human candidate range motion vector 1501 estimated for the human candidate range 1401 detected by the human detection section 211. In the case where the human position estimated by the human candidate range motion vector 1501 is determined to be likely to coincide with the vehicle position following a predetermined time period, the image processing apparatus 200 may be caused to issue a warning of the risk of collision.

An exemplary method used by the human detection section 211 to detect humans from images is the human detection process based on machine learning. Specifically, whether each of detected subjects is human is learned in advance using large amounts of image data (visible light images and far-infrared ray images). Upon receiving input of images of a detected subject similar to previously learned images, the human detection section 211 determines whether that subject is, for example, a bicycle. As another example, deep learning based on multilayer neural networks may be utilized.

Incidentally, what is important for human detection by machine learning is the image data used for the learning. In the case of far-infrared ray images, they vary in luminance depending on ambient temperature. The far-infrared ray images also vary depending on how the temperature is distributed on different persons wearing different clothes. Thus, processes may be included in the human detection process to switch adaptively between optimum dictionaries depending on the ambient temperature. Further, the dictionary data may be learned regarding human body portions excluding those known for large motions such as human limbs (i.e., dictionary data is to center on the trunk). The dictionary data thus learned permits more accurate human detection independent of human (limb) movements.

Figure 20:
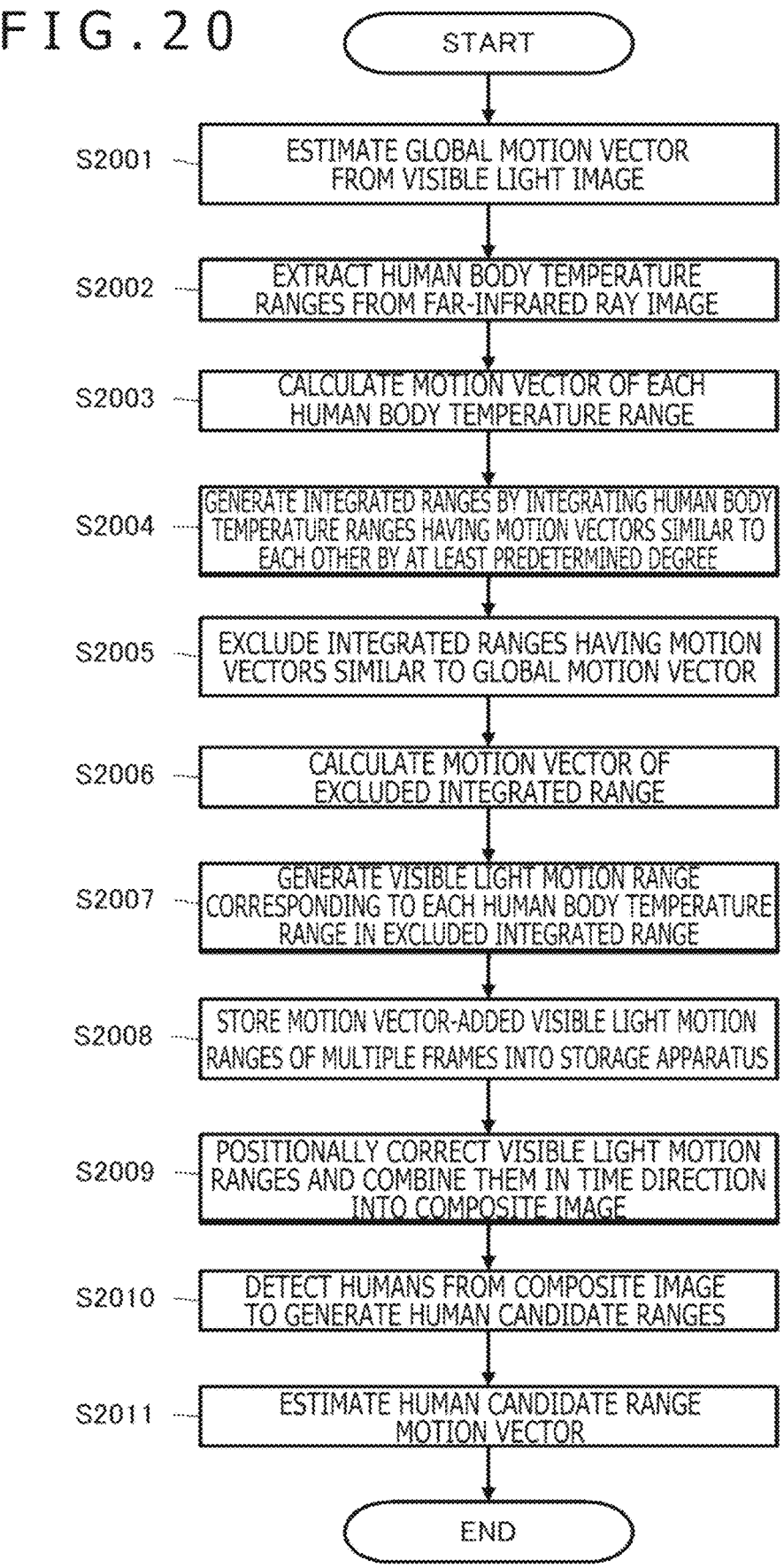
FIG. 20 is a flowchart depicting a processing procedure for detecting an object by use of a visible light image and a far-infrared ray image for observing the same target.

FIG. 20 depicts, in the form of a flowchart, a processing procedure for detecting the desired object such as humans from among obstacles using visible light images captured by the visible light camera 201 and far-infrared ray images captured by the far-infrared ray camera 202 in the image processing apparatus 200.

The global motion vector estimation section 203 obtains the global motion vector 222 from the visible light image 220 of multiple continuous frames input from the visible light camera 201 (step S2001).

From the far-infrared ray image 221 input from the far-infrared ray camera 202, the human body temperature range extraction section 204 extracts, as human body temperature ranges, the ranges of pixels masked with possible human body temperatures (step S2002).

The range-specific motion vector estimation section 205 then obtains a motion vector indicative of the motion of each human body temperature range from the far-infrared ray image 223 of multiple continuous frames from which the human body temperature ranges were extracted in step S2002, and outputs the far-infrared ray image 224 indicative of the motion vector-added human body temperature ranges (step S2003).

The range integration section 206 then compares the motion vectors of the multiple motion vector-added human body temperature ranges included in the far-infrared ray image 224. By so doing, the range integration section 206 integrates human body temperature ranges having motion vectors close to each other by at least a predetermined degree to generate integrated ranges. At the same time, the range integration section 206 integrates groups of motion vectors of the human body temperature ranges included in the integrated ranges to calculate the motion vector of each of the integrated ranges, and outputs the far-infrared ray image 225 indicative of the motion vector-added integrated ranges (step S2004).

The motion vector comparison and exclusion section 207 compares the motion vector of each of the motion vector-added integrated ranges obtained in step S2004 with the global motion vector 222 acquired in step S2001. By so doing, the motion vector comparison and exclusion section 207 excludes the integrated ranges having motion vectors close to the global motion vector 222 by at least a predetermined degree from the motion vector-added integrated ranges in the far-infrared ray image 225 (step S2005). The motion vector comparison and exclusion section 207 thus leaves intact only the motion vector-added integrated ranges having motion vectors different from the global motion vector 222.

The motion vector comparison and exclusion section 207 then integrates the remaining integrated ranges to generate excluded integrated ranges, and calculates the motion vectors of the excluded integrated ranges by integrating the motion vectors of the remaining integrated ranges (step S2006).

The motion vector comparison and exclusion section 207 further receives input of the visible light image 220 acquired by the visible light camera 201, and extracts from the visible light image 220 visible light ranges corresponding to the human body temperature ranges in the excluded integrated ranges so as to generate visible light motion ranges (step S2007). For example, the motion vector comparison and exclusion section 207 extracts the visible light motion ranges corresponding to the remaining human body temperature ranges by masking the visible light image 220 with non-zero ranges (human body temperature ranges) in the excluded integrated ranges.

The motion vector-added visible light motion ranges 226 of multiple frames constituted by the visible light motion ranges and by the integrated range motion vectors are then stored into the storage apparatus 209 (step S2008).

Upon retrieving from the storage apparatus 209 the motion vector-added visible light motion ranges 227 of multiple frames continued in the time direction, the image combination section 210 corrects the positions of the visible light motion ranges on the screen based on motion vector information regarding the motion vector-added visible light motion range 227 of each frame, and combines the visible light motion ranges in the time direction to generate the composite image 228 (step S2009).

The human detection section 211 then generates the human candidate ranges 229 by performing the human detection process on the composite image 228 generated in step S2009 (step S2010).

The human range motion vector estimation section 212 then estimates the human candidate range motion vector 230 indicative of the motion of the human candidate ranges as a whole from the human candidate ranges 229 generated in step S2010 and from the motion vectors of the motion vector-added visible light motion ranges 227 of multiple frames retrieved from the storage apparatus 209 (step S2011). The risk of collision can be predicted by comparing the estimated human candidate range motion vector 230 with the travel route planned for the own vehicle.

Figure 17:
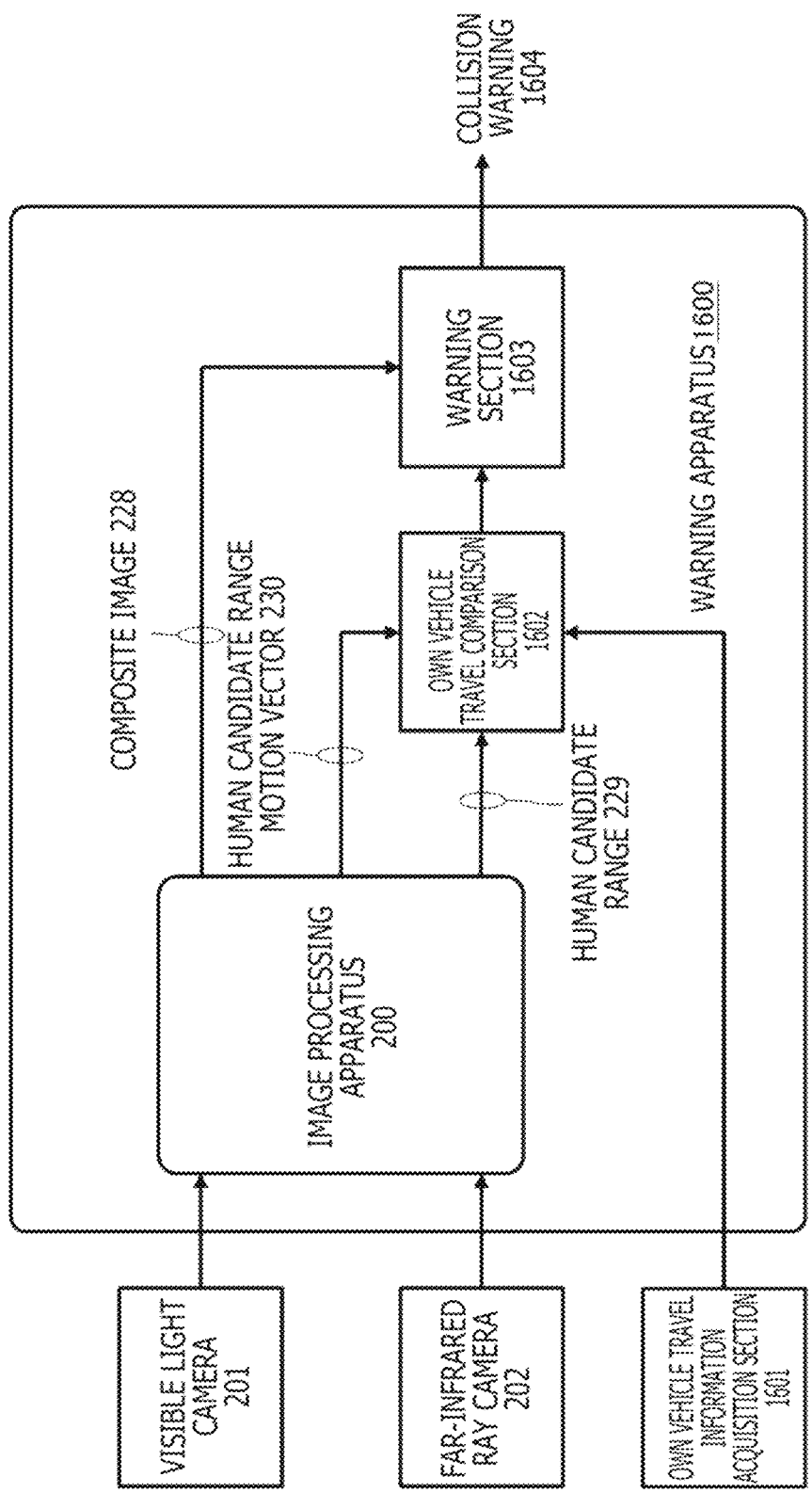
FIG. 17 is a view depicting an exemplary functional configuration of a warning apparatus 1600.

FIG. 17 schematically depicts a functional configuration of a warning apparatus 1600 to which the technology disclosed in this description is applied. The warning apparatus 1600 in FIG. 17 is configured to warn the vehicle driver of the possibility of collision determined to exist between the vehicle and the detected person on the basis of such information as the composite image, the human candidate ranges, and the human candidate range motion vectors output from the image processing apparatus 200 depicted in FIG. 2. Besides being externally connected to the image processing apparatus 200, the warning apparatus 1600 in FIG. 17 may be configured alternatively to have its functions incorporated in the image processing apparatus 200 (as another alternative, the image processing apparatus 200 may have its functions incorporated in the warning apparatus 1600).

The warning apparatus 1600 includes the image processing apparatus 200, an own vehicle travel comparison section 1602, and a warning section 1603.

The image processing apparatus 200 is configured the same as the apparatus depicted in FIG. 2 and thus will not be discussed further in detail. The image processing apparatus 200 receives input of visible light and far-infrared ray images from the visible light camera 201 and the far-infrared ray camera 202 both disposed to observe the same target, and outputs the composite image 228, the human candidate range images 229, and the human candidate range motion vector 230. Alternatively, the image processing apparatus 200 may be configured to be external to the warning apparatus 1600 that may be configured to receive external input of the composite image 228, the human candidate range images 229, and the human candidate range motion vector 230 from the image processing apparatus 200.

An own vehicle travel information acquisition section 1601 is a functional module that acquires information regarding the travel state of the own vehicle. The information indicative of the travel state of the own vehicle includes the speed of the own vehicle, the planned route for the own vehicle, and an expected time of arrival at the destination on the map. For example, the own vehicle travel information acquisition section 1601 may acquire such information indicative of the travel state of the own vehicle from the state prediction section 154 in the vehicle control system 100 depicted in FIG. 1.

Based on values obtained from the own vehicle travel information acquisition section 1601 and on the human candidate range motion vector 230 and the human candidate ranges 229 acquired from the image processing apparatus 200, the own vehicle travel comparison section 1602 estimates relative positional relations between the own vehicle and human candidates following a predetermined time period, calculates the possibility of collision therebetween, and transfers the result of the calculation to the warning section 1603. The own vehicle travel comparison section 1602 may be alternatively configured using the state analysis section 133 and the planning section 134 in FIG. 1.

When the possibility of the own vehicle colliding with a human candidate following a predetermined time period exceeds a predetermined threshold level, the warning section 1603 warns the driver of the own vehicle of the danger. The warning section 1603 may be configured as desired. For example, the warning section 1603 may be configured as any one of such diverse devices as a driver-oriented display for displaying warning images, an audio output apparatus for outputting warning sounds, a warning lamp, or an apparatus for giving vibrations or electrical stimulations to the driver. The warning section 1603 may, for example, cause the driver-oriented display to display the composite image 228 input from the image processing apparatus 200, thereby presenting the driver with the risk of collision.

The warning section 1603 may be implemented alternatively in the form of the emergency avoidance section 171 in FIG. 1. Further, the warning section 1603 may be expected to issue a warning using the output control section 105 and the output section 106 in the vehicle control system 100 depicted in FIG. 1.

Figure 18:
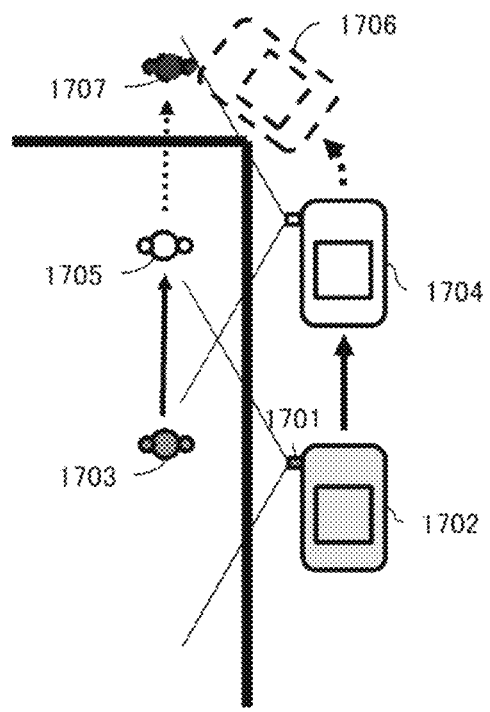
FIG. 18 is a view depicting an example of how an own vehicle travel comparison section 1602 determines the possibility of collision.

FIG. 18 depicts an example of how the own vehicle travel comparison section 1602 determines the possibility of collision.

The own vehicle travel comparison section 1602 estimates a left turn that the own vehicle is expected to make at the next intersection, an expected time of the left turn, and an own vehicle position 1706 at that expected time, on the basis of such information as a past own vehicle position 1702, a current own vehicle position 1704, the speed of the own vehicle input from the own vehicle travel information acquisition section 1601, and the planned route for the own vehicle.

The own vehicle travel comparison section 1602 further receives input of the information regarding the human candidate ranges 229 and the human candidate range motion vector 230 from the image processing apparatus 200. The own vehicle travel comparison section 1602 then estimates the position of a target 1707 at the expected time of the left turn by the own vehicle at the intersection, based on the positions of the human candidate ranges imaged at the time of observing a target 1703 from the past own vehicle position 1702 with an onboard camera 1701, on the positions of the human candidate ranges imaged at the time of observing a target 1705 from the current own vehicle position 1704 with the onboard camera, and on the motion vector of the human candidate ranges.

The own vehicle travel comparison section 1602 proceeds to calculate the possibility of collision from the positional relations between the own vehicle position 1706 estimated at the expected time of the left turn at the intersection on one hand, and the position of the target 1707 estimated at that expected time of the left turn on the other hand.

In the case where there is a possibility of collision, the warning section 1603 presents the driver with a warning of the risk of collision using, for example, a method of causing the driver-oriented display to display the composite image 228 input from the image processing apparatus 200.

As explained above, the image processing apparatus 200 to which the technology disclosed in this description is applied makes it possible to detect humans that are behind obstacles such as roadside trees and are thus difficult to detect visually or by use of visible light cameras or distance sensors. On the basis of the information output from the image processing apparatus 200, the warning apparatus 1600 can issue appropriate warnings to the driver and thereby prevent dangerous collision accidents.

INDUSTRIAL APPLICABILITY

The technology disclosed in this description has been explained above in detail with reference to specific embodiments. These embodiments, however, may obviously be modified diversely or replaced with some other appropriate embodiments by those skilled in the art without departing from the spirit and scope of the disclosed technology.

The technology disclosed in this description may be applied to diverse vehicles such as automobiles (including gasoline-powered vehicles and diesel-powered vehicles), electric vehicles, hybrid electric vehicles, motorcycles, bicycles, and personal mobility devices. The disclosed technology may also be applied to mobile bodies other than the vehicles traveling on the road.

Further, the technology disclosed in this description may be applied to objects other than the mobile bodies. For example, surveillance cameras to which the disclosed technology is applied can capture motions of suspicions individuals partially hidden by roadside trees, railings, or other obstacles.

In conclusion, whereas the technology disclosed in this description has been explained using examples, the details of this description should not be construed restrictively. Thus, the scope of the disclosed technology should be determined by the appended claims and their legal equivalents, rather than by the examples given.

The technology disclosed in this description may be implemented preferably in the following configurations:

(1)

An image processing apparatus including:

a vector estimation section configured to estimate, from a visible light image captured by a visible light camera, a global motion vector indicative of a motion of the image as a whole;

a range extraction section configured to extract, from a far-infrared ray image captured by a far-infrared ray camera for imaging the same target as the visible light camera, specific temperature ranges constituted by pixels having values falling within a temperature range characteristic of a specific target;

a range integration section configured to integrate, of the extracted specific temperature ranges, those ranges having motion vectors close to each other so as to generate integrated ranges;

a range exclusion section configured to exclude the integrated ranges having motion vectors close to the global motion vector to obtain excluded integrated ranges, before extracting from the visible light image the visible light ranges corresponding to the specific temperature ranges in the excluded integrated ranges so as to generate visible light motion ranges; and an image combination section configured to correct positions of the visible light motion ranges based on the motion vector of the excluded integrated ranges as a whole, before combining the positionally corrected visible light motion ranges in a time direction.

(2)

The image processing apparatus as stated in paragraph (1) above, in which the image combination section corrects the positions of the visible light motion ranges in such a manner that the positions remain unchanged on a screen in the time direction.

(3)

The image processing apparatus as stated in paragraph (1) or (2) above, in which the range extraction section extracts specific temperature ranges constituted by pixels having values falling within the temperature range including human body temperatures.

(4)

The image processing apparatus as stated in any one of paragraphs (1) to (3) above, further including:

a detection section configured to detect a range that includes the specific target from a composite image generated by the image combination section.

(5)

The image processing apparatus as stated in paragraph (4) above, in which the detection section determines the target in the detected range.

(6)

The image processing apparatus as stated in paragraph (5) above, in which the detection section performs the detection process by use of a dictionary adapted to an ambient temperature.

(7)

The image processing apparatus as stated in paragraph (5) or (6) above, in which the detection section performs the detection process by use of a dictionary adapted to an ambient temperature.

(8)

The image processing apparatus as stated in any one of paragraphs (4) to (6) above, further including:

a motion estimation section configured to estimate a motion of the range detected by the detection section.

(9)

The image processing apparatus as stated in paragraph (8) above, in which the motion estimation section estimates the motion of the specific target on the basis of an average of the motion vectors of the ranges detected over multiple frames.

(10)

The image processing apparatus as stated in any one of paragraphs (1) to (9) above, in which the visible light camera and the far-infrared ray camera are mounted on a predetermined mobile body.

(11)

The image processing apparatus as stated in any one of paragraphs (1) to (10) above, further including:

the visible light camera and the far-infrared ray camera.

(12)

The image processing apparatus as stated in paragraph (10) or (11) above, in which the image processing apparatus is mounted on the mobile body.

(13)

The image processing apparatus as stated in any one of paragraphs (1) to (12) above, further including:

a comparison section configured to make a relative comparison between the position of the specific target following a predetermined time period on one hand, the position being predicted on the basis of the motion vectors of the excluded integrated ranges, and an expected arrival position of the mobile body following the same time period on the other hand.

(14)

The image processing apparatus as stated in paragraph (13) above, further including:

a warning section configured to present a driver of the mobile body with a warning of a risk of collision reflecting a possibility, being calculated on the basis of the relative position, of collision between the specific target and the mobile body.

(15)

The image processing apparatus as stated in paragraph (14) above, in which the warning section presents information including the composite image generated by the image combination section.

(16)

The image processing apparatus as stated in any one of paragraphs (1) to (15) above, in which the image combination section combines in the time direction the excluded integrated ranges constituted by far-infrared ray images and positionally corrected on the basis of the motion vector of the excluded integrated ranges as a whole.

(17)

The image processing apparatus as stated in paragraph (16) above, in which the image combination section combines the excluded integrated ranges constituted by either visible light motion ranges or far-infrared ray images depending either on a time zone in which the visible light camera and the far-infrared ray camera performed imaging or on an imaging condition.

(18)

The image processing apparatus as stated in any one of paragraphs (1) to (17) above, further including:

a display section configured to display a composite image generated by the image combination section.

(19)

An image processing method including the steps of:

estimating, from a visible light image captured by a visible light camera, a global motion vector indicative of a motion of the image as a whole;

extracting, from a far-infrared ray image captured by a far-infrared ray camera for imaging the same target as the visible light camera, specific temperature ranges constituted by pixels having values falling within a temperature range characteristic of a specific target;

integrating, of the extracted specific temperature ranges, those ranges having motion vectors close to each other so as to generate integrated ranges;

excluding the integrated ranges having motion vectors close to the global motion vector to obtain excluded integrated ranges, before extracting from the visible light image the visible light ranges corresponding to the specific temperature ranges in the excluded integrated ranges so as to generate visible light motion ranges; and correcting positions of the visible light motion ranges based on the motion vector of the excluded integrated ranges as a whole, before combining the positionally corrected visible light motion ranges in a time direction.

(20)

A computer program described in a computer-readable format for causing a computer to function as:

a vector estimation section configured to estimate, from a visible light image captured by a visible light camera, a global motion vector indicative of a motion of the image as a whole;

a range extraction section configured to extract, from a far-infrared ray image captured by a far-infrared ray camera for imaging the same target as the visible light camera, specific temperature ranges constituted by pixels having values falling within a temperature range characteristic of a specific target;

a range integration section configured to integrate, of the extracted specific temperature ranges, those ranges having motion vectors close to each other so as to generate integrated ranges;

a range exclusion section configured to exclude the integrated ranges having motion vectors close to the global motion vector to obtain excluded integrated ranges, before extracting from the visible light image the visible light ranges corresponding to the specific temperature ranges in the excluded integrated ranges so as to generate visible light motion ranges; and an image combination section configured to correct positions of the visible light motion ranges based on the motion vector of the excluded integrated ranges as a whole, before combining the positionally corrected visible light motion ranges in a time direction.

REFERENCE SIGNS LIST

100 . . . Vehicle control system
101 . . . Input section, 102 . . . Data acquisition section, 103 . . . Communication section
104 . . . In-vehicle device, 105 . . . Output control section, 106 . . . Output section
107 . . . Driving system control section, 108 . . . Driving system
109 . . . Body system control section, 110 . . . Body system, 111 . . . Storage section
112 . . . Automated driving control section, 121 . . . communication network
131 . . . Detection section, 132 . . . Self-position estimation section, 133 . . . State analysis section
134 . . . Planning section, 135 . . . Operation control section
141 . . . Outside-vehicle information detection section, 142 . . . In-vehicle information detection section
143 . . . Vehicle state detection section
151 . . . Map analysis section, 152 . . . Traffic rule recognition section
153 . . . State recognition section, 154 . . . State prediction section
161 . . . Route planning section, 162 . . . Action planning section, 163 . . . Operation planning section
171 . . . Emergency avoidance section, 172 . . . Acceleration/deceleration control section, 173 . . . Direction control section
200 . . . Image processing apparatus
201 . . . Visible light camera, 202 . . . Far-infrared ray camera
203 . . . Global motion vector estimation section
204 . . . Human body temperature range extraction section, 205 . . . Range-specific motion vector estimation section
206 . . . Range integration section, 207 . . . Motion vector comparison and exclusion section
208 . . . Storage processing section, 209 . . . Storage apparatus, 210 . . . Image combination section
211 . . . Human detection section, 212 . . . Human range motion vector estimation section
240 . . . Display apparatus
1600 . . . Warning apparatus, 1601 . . . Own vehicle travel information acquisition section
1602 . . . Own vehicle travel comparison section,
1603 . . . Warning section

The invention claimed is:

1. An image processing apparatus comprising:
a vector estimation section configured to estimate, from a visible light image captured by a visible light camera, a global motion vector indicative of a motion of the image as a whole;
a range extraction section configured to extract, from a far-infrared ray image captured by a far-infrared ray camera for imaging a same target as the visible light camera, specific temperature ranges constituted by pixels having values falling within a temperature range characteristic of a specific target;
a range integration section configured to integrate, of the extracted specific temperature ranges, those ranges having motion vectors close to each other so as to generate integrated ranges;
a range exclusion section configured to exclude the integrated ranges having motion vectors close to the global motion vector to obtain excluded integrated ranges, before extracting from the visible light image the visible light ranges corresponding to the specific temperature ranges in the excluded integrated ranges so as to generate visible light motion ranges; and
an image combination section configured to correct positions of the visible light motion ranges based on the motion vector of the excluded integrated ranges as a whole, before combining the positionally corrected visible light motion ranges in a time direction.

2. The image processing apparatus according to claim 1, wherein
the image combination section corrects the positions of the visible light motion ranges in such a manner that the positions remain unchanged on a screen in the time direction.

3. The image processing apparatus according to claim 1, wherein
the range extraction section extracts specific temperature ranges constituted by pixels having values falling within the temperature range including human body temperatures.

4. The image processing apparatus according to claim 1, further comprising:
a detection section configured to detect a range that includes the specific target from a composite image generated by the image combination section.

5. The image processing apparatus according to claim 4, wherein
the detection section performs a detection process by use of machine learning.

6. The image processing apparatus according to claim 5, wherein
the detection section determines the target in the detected range.

7. The image processing apparatus according to claim 5, wherein
the detection section performs the detection process by use of a dictionary adapted to an ambient temperature.

8. The image processing apparatus according to claim 4, further comprising:
a motion estimation section configured to estimate a motion of the range detected by the detection section.

9. The image processing apparatus according to claim 8, wherein
the motion estimation section estimates the motion of the specific target on a basis of an average of the motion vectors of the ranges detected over a plurality of frames.

10. The image processing apparatus according to claim 1, wherein
the visible light camera and the far-infrared ray camera are mounted on a predetermined mobile body.

11. The image processing apparatus according to claim 1, further comprising:
the visible light camera and the far-infrared ray camera.

12. The image processing apparatus according to claim 10, wherein
the image processing apparatus is mounted on the mobile body.

13. The image processing apparatus according to claim 1, further comprising:
a comparison section configured to make a relative comparison between the position of the specific target following a predetermined time period on one hand, the position being predicted on a basis of the motion vectors of the excluded integrated ranges, and an expected arrival position of the mobile body following a same time period on the other hand.

14. The image processing apparatus according to claim 13, further comprising:
a warning section configured to present a driver of the mobile body with a warning of a risk of collision reflecting a possibility, being calculated on a basis of the relative position, of collision between the specific target and the mobile body.

15. The image processing apparatus according to claim 14, wherein
the warning section presents information including the composite image generated by the image combination section.

16. The image processing apparatus according to claim 1, wherein
the image combination section combines in the time direction the excluded integrated ranges constituted by far-infrared ray images and positionally corrected on a basis of the motion vector of the excluded integrated ranges as a whole.

17. The image processing apparatus according to claim 16, wherein
the image combination section combines the excluded integrated ranges constituted by either visible light motion ranges or far-infrared ray images depending either on a time zone in which the visible light camera and the far-infrared ray camera performed imaging or on an imaging condition.

18. The image processing apparatus according to claim 1, further comprising:
a display section configured to display a composite image generated by the image combination section.

19. An image processing method comprising the steps of:
estimating, from a visible light image captured by a visible light camera, a global motion vector indicative of a motion of the image as a whole;
extracting, from a far-infrared ray image captured by a far-infrared ray camera for imaging a same target as the visible light camera, specific temperature ranges constituted by pixels having values falling within a temperature range characteristic of a specific target;
integrating, of the extracted specific temperature ranges, those ranges having motion vectors close to each other so as to generate integrated ranges;
excluding the integrated ranges having motion vectors close to the global motion vector to obtain excluded integrated ranges, before extracting from the visible light image the visible light ranges corresponding to the specific temperature ranges in the excluded integrated ranges so as to generate visible light motion ranges; and
correcting positions of the visible light motion ranges based on the motion vector of the excluded integrated ranges as a whole, before combining the positionally corrected visible light motion ranges in a time direction.

* * * * *